US012718361B2

(12) United States Patent
Rainer et al.

(10) Patent No.: US 12,718,361 B2
(45) Date of Patent: Aug. 25, 2026

(54) METHOD FOR AUTOMATIC IDENTIFICATION OF CARDIAC SEGMENTED REGIONS

(71) Applicants: Werner Rainer, Bolzano (IT); Anastasiia Bazhutina, Bolzano (IT); Mikhail Chmelevsky Petrovich, Bolzano (IT); Stepan Zubarev, Bolzano (IT); Margarita Budanova, Bolzano (IT)

(72) Inventors: Werner Rainer, Bolzano (IT); Anastasiia Bazhutina, Bolzano (IT); Mikhail Chmelevsky Petrovich, Bolzano (IT); Stepan Zubarev, Bolzano (IT); Margarita Budanova, Bolzano (IT)

(73) Assignee: XSPLINE S.P.A., Bolzano (IT)

( * ) Notice: Subject to any disclaimer, the term of this patent is extended or adjusted under 35 U.S.C. 154(b) by 369 days.

(21) Appl. No.: 18/427,468

(22) Filed: Jan. 30, 2024

(65) Prior Publication Data

US 2024/0303808 A1 Sep. 12, 2024

(30) Foreign Application Priority Data

Mar. 10, 2023 (IT) ........................ 102023000004581

(51) Int. Cl.
*G06T 7/00* (2017.01)
*G06T 7/12* (2017.01)

(52) U.S. Cl.
CPC .............. *G06T 7/0012* (2013.01); *G06T 7/12* (2017.01); *G06T 2207/30048* (2013.01)

(58) Field of Classification Search
CPC ..................... G06T 7/0012; G06T 7/12; G06T 2207/30048

(Continued)

(56) References Cited

U.S. PATENT DOCUMENTS

2016/0140751 A1* 5/2016 Jafarkhani .............. G06T 19/20 382/131
2016/0220311 A1* 8/2016 Mansi .................... A61B 8/463

(Continued)

OTHER PUBLICATIONS

Search Report from related European Patent Application No. 24154122.6 dated Jul. 30, 2024.

(Continued)

*Primary Examiner* — Gabriel I Garcia
(74) *Attorney, Agent, or Firm* — McCarter & English, LLP

(57) ABSTRACT

Method for automatic identification of segmented regions of a heart, the method being executed by a control unit and including the steps of: acquiring a heart mesh that is a 3D graphical representation of the heart, including a left ventricle, a right ventricle, a heart apex and a heart base; determining a heart base plane corresponding to the heart base; determining, based on the heart base and the heart apex, a left ventricular axis extending across the left ventricle, from the heart apex to the heart base; using the heart base plane and the left ventricular axis to identify segmented regions indicative of the left ventricle and the right ventricle, each segmented region being a respective portion of the heart mesh satisfying a respective first criterion about a distance range from the heart base plane and a respective second criterion about a circumferential angular range about the left ventricular axis.

20 Claims, 9 Drawing Sheets

(58) Field of Classification Search
USPC .......................................................... 382/128
See application file for complete search history.

(56) References Cited

U.S. PATENT DOCUMENTS

2018/0132724 A1* 5/2018 Waechter-Stehle .......................... A61B 8/4218
2021/0287367 A1* 9/2021 Meyer ....................... G06T 7/13

OTHER PUBLICATIONS

Tobon-Gomez C. et al: "Understanding the mechanisms amenable to CRT response: from pre-operative multimodal image data to patient-specific computational models", Medical and Biological Engineering and Computing. vol. 51, No. 11 Feb. 21, 2013, pp. 1235-1250, XP093087325, Retrieved from the Internet: URL:http://link.springer.com/article/10.10 07/s11517-013-1044-7/fulltext.html.

Zhang Yongjie Jessica et al: "Finite Element Meshing for Cardiac Analysis", Aug. 2004 (Aug. 2004), XP093089944, Austin, USA Retrieved from the Internet: URL:https://www.researchgate.net/publication/2932825_Finite_Element_Meshing_For_Card iac_Analysis [retrieved on Oct. 9, 2023].

Zhang et al., Finite Element Meshing for Cardiac Analysis, Institute for Computational Engineering and Sciences, Aug. 2004.

Tobon-Gomez, et al., Understanding the Mechanisms Amendable to CRT Response: from Pre-operative Multimodal Image Data to Patient-Specific Computational Models, Medical Biological Engineering and Computing, 51:11, 1235-1250, 2013.

Italian Search Report and Written Opinion dated Oct. 9, 2023 for Italian Application No. 2023000004581.

* cited by examiner

20

22

22

22

20

$P_1$-$P_{26}$
40

80

$P_{16}$
40

79
79a
76
77
78
79a
74
79b
76
40

66
68
40

72
72
40
70

64a
64b
64c
64d
64e
64f
64g
64h
40
56
58
A5, A11
A16
A6, A12
A13
A1, A7
A15
A4, A10
A2, A8
A3, A9
A20, A23, A26
A14
A18, A21, A24
A19, A22, A25
P1
P13
P15

METHOD FOR AUTOMATIC IDENTIFICATION OF CARDIAC SEGMENTED REGIONS

CROSS-REFERENCE TO RELATED APPLICATIONS

This patent application claims priority from Italian Patent Application No. 102023000004581, filed on Mar. 10, 2023, the entire disclosure of which is incorporated herein by reference.

TECHNICAL FIELD

The present invention relates to a method for automatic identification of cardiac segmented regions. In particular, this method allows for an automatic 3D identification and visualization of the segmented regions (improved in comparison with the known 17-segments model provided by the AHA) starting from a cardiac 3D mesh. The present invention further relates to a segmented region identifier device for implementing this method and to a respective computer program product.

BACKGROUND

As known, efficient and fast reconstruction of the cardiac ventricular activation sequence from ECG signals is crucial for performing several medical procedures and thus improving the success of procedural outcome.

In particular, the ECG (electrocardiogram) signals acquired from a patient's torso correspond to electric potentials measured on the patient's skin (e.g., on the skin of the torso of the patient); such electric potentials vary due to depolarization and repolarization of the heart and thus are indicative of the electrical activity of the cardiac muscle at each cardiac cycle (heartbeat). Reconstruction of the cardiac ventricular activation from the ECG signals allows, for example, to perform more efficiently cardiac mapping procedures of the patient since the physician performing this procedure can be aware in advance of the specific conditions of the patient's heart and thus is able to place the catheter in the most appropriate regions of the heart (analogously, another application is the placing of pacemaker electrodes).

In order to obtain an activation map of the patient's heart (indicative of time propagation in the myocardium of an action electrical potential), an efficient and accurate medical visualization and mathematical modelling of the processes taking place in the heart is required.

This requires modelling the heart by identifying and classifying different cardiac regions, in order to rapidly and efficiently recognize the different parts of the heart involved in the propagation of the electrical potential signals across the heart.

One of the most famous ways for segmenting the heart into areas (segmented regions) is a standard 17-segments model that was suggested by the American Heart Association, AHA (American Heart Association Writing Group on Myocardial Segmentation and Registration for Cardiac Imaging et al. "*Standardized myocardial segmentation and nomenclature for tomographic imaging of the heart: a statement for healthcare professionals from the Cardiac Imaging Committee of the Council on Clinical Cardiology of the American Heart Association.*" *Circulation* 105.4 (2002): 539-542). This model is set on the geometry of the left ventricle and is used for example in echocardiography for estimation of cardiac wall thicknesses movement, as well as in cardiac MRI for scar/fibrosis localization. In addition, the 17-segment AHA model may be useful for pre-procedural assessment of cardiac regions before CRT (Cardiac Resynchronization Therapy) devices implantation.

In particular, FIG. 1A schematically shows the 17-segment AHA model (indicated with the reference number 1 and here considered in 2D and transversally to the patient's heart, i.e. orthogonally to a left ventricular axis of the heart), identifying seventeen segmented regions $P_1$-$P_{17}$ of the left ventricle. Then, FIG. 1B schematically shows the 3D model 2 of the heart based on the 17-segment AHA model, i.e. the graphical representation of the application of the 17-segment AHA model to the 3D model of the left ventricle of the heart, where different segmented regions of the AHA model are identified with different grey shades of filling.

Generally, in modelling tasks the 17-segment AHA model may be used for selecting patient-specific parameters of the heart local conductivity. In other words, instead of solving optimization problems in each point of the heart during its modelling, the centres of the 17-segments AHA model may be used to reach this goal. Therefore, automatic sectorization of the heart geometry into segmented regions is an important task for mathematical modelling and medical visualization.

Nevertheless, the 17-segments AHA model has two major limitations: this model only considers the left ventricle of the heart and therefore is not applicable to the right ventricle, thus leading to an incomplete characterization of the electrical properties of the heart; and applying manually or through semi-automatic methods the AHA model to the 3D heart representation can be computationally expensive (i.e., the required numerical calculations take a long time using a personal computer), leading to difficulties in its actual clinical use for 3D visualization (e.g., there are no open source software/tools to draw the AHA segmented regions on a cardiac surface).

Nowadays, in recent scientific publications there are several examples of methods for building the 17-segments AHA model. For instance, well-known scientific research works (e.g., Monaci, Sofia, et al. "*Automated Localization of Focal Ventricular Tachycardia From Simulated Implanted Device Electrograms: A Combined Physics—AI Approach.*" *Frontiers in Physiology* 12 (2021); and Malkasian, Shant, et al. "*Vessel-specific coronary perfusion territories using a CT angiogram with a minimum cost path technique and its direct comparison to the American Heart Association 17-segment model.*" *European radiology* 30.6 (2020): 3334-3345) show the 17-segments AHA model applied only to the left ventricle of one patient heart or several porcine hearts. Moreover, in a well-known review (Mihalef, Viorel, et al. "*Implementation of a patient-specific cardiac model.*" *Artificial Intelligence for Computational Modeling of the Heart. Academic Press,* 2020. 43-94), the 17-segments AHA model is built universally for any heart geometry, based on automatic cardiac segmentation of CT (Computed Tomography) and MRI (Magnetic Resonance Imaging) scans. Such segmented cardiac meshes have additional meta-information about epicardial, endocardial, heart base (i.e., heart points that lie on a virtual plane which crosses the heart across the left and right fibrosis rings) and heart apex (i.e., the extremal point of the left ventricle which lies opposite the heart base) location that simplifies segmentation of the heart geometry into regions. However, only the left ventricle is considered for AHA segmentation.

Therefore, the development of a generic method for automatic sectorisation of the whole heart into segmented regions is required in order to use the advantages of the AHA model in clinical practice.

SUMMARY

The aim of the present invention is to provide a method for identifying segmented regions of a heart, a segmented region identifier device and a computer program product thereof, that overcome the issues mentioned above.

According to the present invention, a method for identifying segmented regions of a heart, a segmented region identifier device and a computer program product are provided, as defined in the annexed claims.

BRIEF DESCRIPTION OF THE DRAWINGS

For a better understanding of the present invention, preferred embodiments thereof are now described, purely by way of non-limiting example and with reference to the attached drawings, wherein.

In particular, the figures are shown with reference to a triaxial Cartesian reference system defined by an X axis, a Y axis and a Z axis, orthogonal to each other.

In the following, elements common to the different embodiments have been indicated with the same reference numbers.

DESCRIPTION OF EMBODIMENTS

Figure 2:
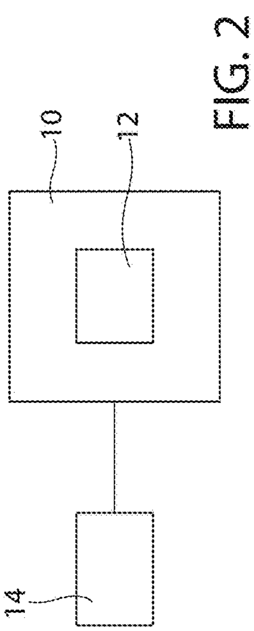
FIG. 2 is a block diagram schematically showing a segmented region identifier device coupled to an image acquisition apparatus, according to an embodiment of the present invention.

FIG. 2 shows a segmented region identifier device 10 (in the following also called device 10) configured to implement a method for identifying segmented regions $P_1$-$P_{26}$ of a heart (also called for simplicity method and shown in FIG. 3 with the reference number 100). In details, the method 100 allows to obtain a 3D representation (model) of the heart where twenty-six segmented regions $P_1$-$P_{26}$ are shown.

In particular, the device 10 comprises a control unit 12 (such as an AP, a processor or a dedicated control unit) configured to implement the method 100.

For example, the device 10 (in particular, the control unit 12) is operatively coupled to an image acquisition apparatus 14, external to the device 10 and of a per se known type. The image acquisition apparatus 14 is configured to acquire a 3D graphical representation of the heart of the patient, in the form of a 3D mesh. For example, the image acquisition apparatus 14 is a CT apparatus or a MRI apparatus.

Figure 3:
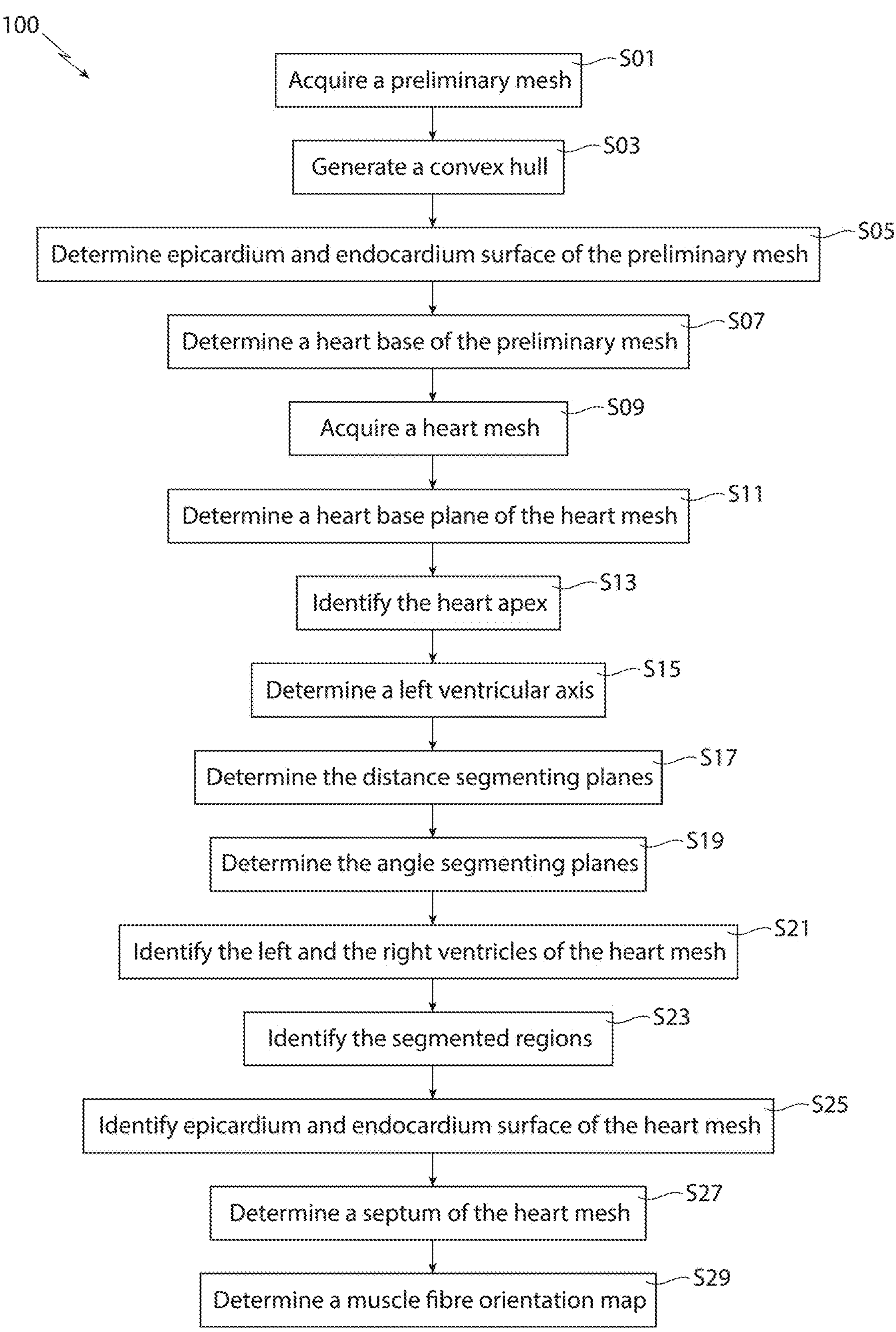
FIG. 3 is a block diagram schematically showing a method for identifying segmented regions of the heart, carried out in use by the segmented region identifier device of FIG. 2, according to an embodiment of the present invention.

FIG. 3 shows the method 100 implemented, in use, by the device 10.

Figures 4A, 4B, 4C, 4D, 4E:
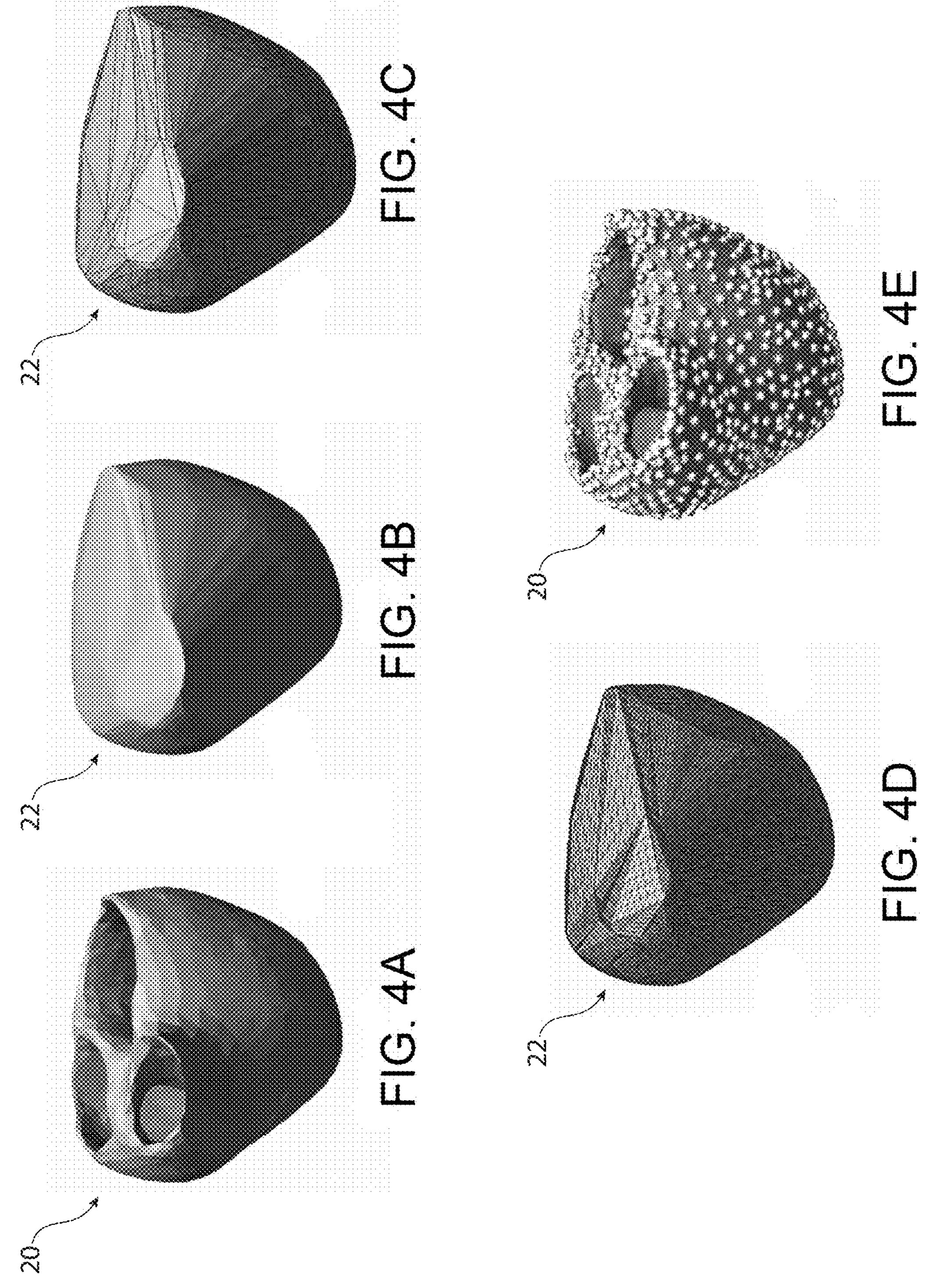
FIGS. 4A-4J and 5A-5K are perspective views of meshes obtained through the method of FIG. 3 and corresponding to respective steps of the method, according to an embodiment of the present invention.

At a step S01 of the method 100, a first mesh of the heart of the patient is acquired. The first mesh is also called in the following preliminary mesh and is shown in FIG. 4A with the reference number 20.

The preliminary mesh 20 is a 3D graphical representation of the heart. In details, the preliminary mesh 20 comprises N mesh points extending in a 3D space. Each point of the mesh is connected to its nearest neighbour points through respective lines, thus forming a multiplicity of cells of the mesh. Each cell (or face) is defined and delimited by at least three points of the mesh that are connected to each other through respective lines of the mesh, thus defining a closed polygonal shape of the cell. In particular, the cells of the preliminary mesh 20 have triangular shape.

In details, the preliminary mesh 20 reproduces the physical structure of the heart, which comprises a heart basis, a heart apex, a left ventricle and a right ventricle, as per se known. In further details, the preliminary mesh 20 represents the heart from the heart apex up to the heart basis, thus from the heart apex up to the atria-ventricular sulcus.

For example, the preliminary mesh 20 is received by the control unit 12 from the image acquisition apparatus 14 that generates it by performing on the patient known image acquisition techniques of the medical field (e.g., CT or MRI).

At a step S03 consecutive to step S01, a convex hull of the preliminary mesh 20 is generated. The convex hull is shown in FIG. 4B with the reference number 22.

In geometry, the convex hull of an object is the smallest convex set that contains the object. Analogously to the mesh, the convex hull is formed by points interconnected through lines defining cells of the convex hull. For example, the cells of the convex hull 22 have also triangular shape. The convex hull 22 is obtained though per se known techniques and tools (e.g., Preparata, Franco P., and Se June Hong. "*Convex hulls of finite sets of points in two and three dimensions.*" *Communications of the ACM* 20.2 (1977): 87-93, https://en.wikipedia.org/wiki/Convex_hull_algorithms). For example the QuikHull algorithm (Wu, Tianhao, and Abbas Firoozabadi. "*Mechanical properties and failure envelope of kerogen matrix by molecular dynamics simulations.*" *The Journal of Physical Chemistry C* 124.4 (2020): 2289-2294. https://en.wikipedia.org/wiki/Quickhull) can be used.

Optionally, the size of the cells of the convex hull 22 can be reduced to achieve a better accuracy of approximation of the preliminary mesh 20. In details, the convex hull 22 can be formed, when generated, by $M_1$ points and then its size can be refined by using $M_2>M_1$ points to better approximate the preliminary mesh 20. This is achieved through per se known techniques and tools, such as by using open-source libraries (e.g., pyacvd library, https://pypi.org/project/pyacvd/). For example, FIGS. 4C and 4D show progressive refinements of the mesh size of the convex hull 22 of FIG. 4B, respectively with $M_2>M_1$ points and $M_3>M_2$ points.

Figures 4F, 4G, 4H, 4I, 4J:
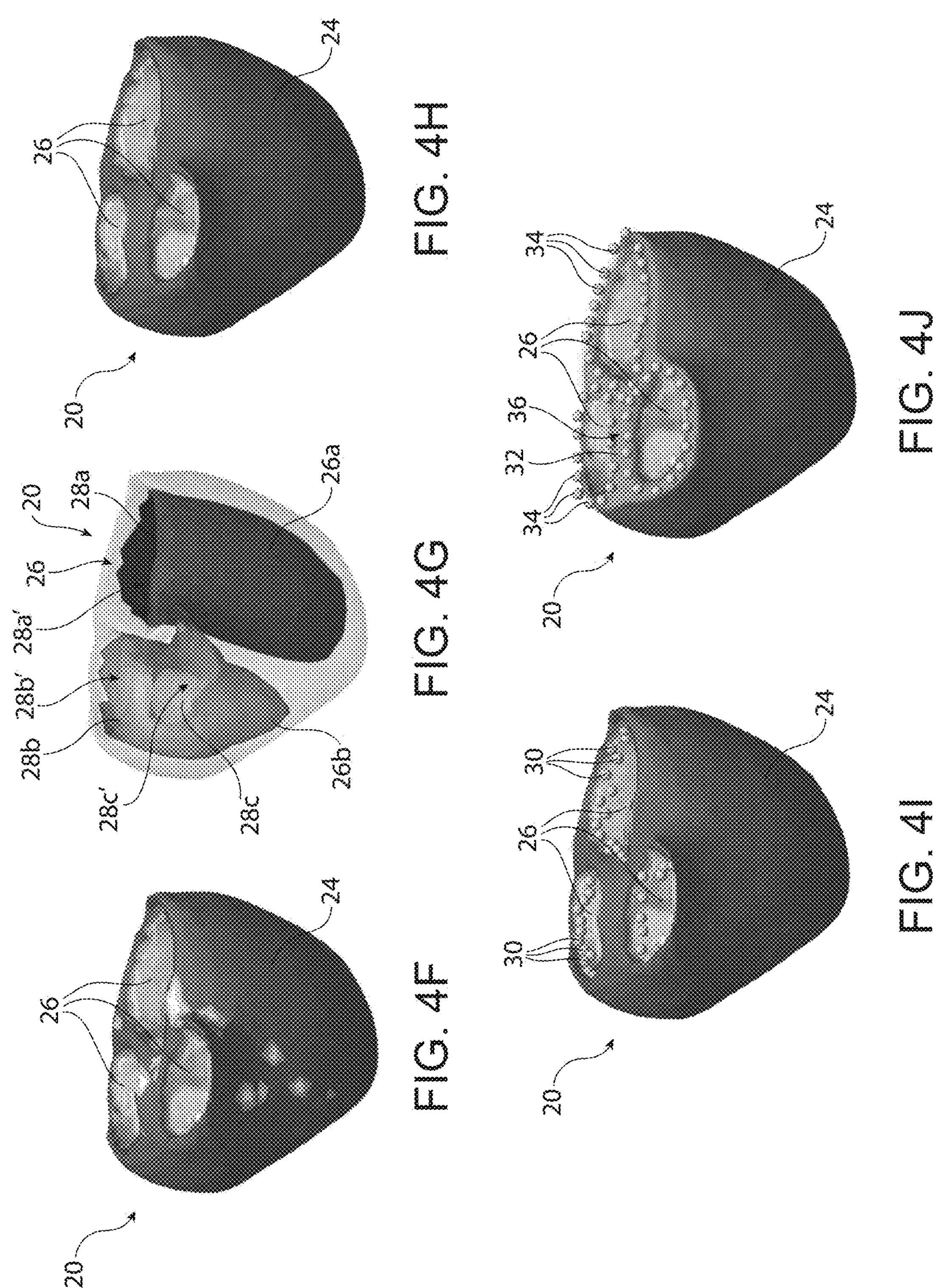

At a step S05 consecutive to step S03, an epicardium surface and an endocardium surface of the preliminary mesh 20 are determined, based on the preliminary mesh 20 and the convex hull 22. The epicardium and the endocardium surfaces of the preliminary mesh 20 are shown in FIG. 4F with the respective reference numbers 24 and 26.

In details, the epicardium surface 24 is an outer (external) surface of the preliminary mesh 20 that represents the epicardium surface of the heart of the patient. Moreover, the endocardium surface 26 is an inner (internal) surface of the preliminary mesh 20 that represents the endocardium surface of the heart of the patient.

In particular, the epicardium surface 24 and the endocardium surface 26 of the preliminary mesh 20 are determined by comparing the preliminary mesh 20 and the convex hull 22.

In details, for each point of the convex hull 22, a respective point of the preliminary mesh 20 that is the closest one, among the points of the preliminary mesh 20, to said considered point of convex hull 22 is determined. In other words, in this step a subset of points of the preliminary mesh 20 is determined, wherein each point of this subset is the point of the preliminary mesh 20 that is the closest one to a respective point of the convex hull 22. Therefore, in this step each point of the convex hull 22 is associated to a respective nearest point of the preliminary mesh 20. In further details, this is performed by calculating the distances of all the points of the preliminary mesh 20 from each point of the convex hull 22 and then by identifying, for each point of the convex hull 22, the minimum distance among the distances calculated for this point; the point of the preliminary mesh 20 having this minimum distance from the considered point of the convex hull 22 is identified as the closest point of the preliminary mesh 20 to this point of the convex hull 22 and is included in the subset of points of the preliminary mesh 20. For example, the distances between the points can be calculated as Euclidean distances, using Euclidean metric (https://en.wikipedia.org/wiki/Euclidean_distance).

The points of this subset define the epicardium surface 24, while all the other points of the preliminary mesh 20 define the endocardium surface 26. In other words, the points of the preliminary mesh 20 classified as closest to respective points of the convex hull 22 form the epicardium surface 24 and the remaining points form the endocardium surface 26.

In details, FIG. 4E shows the preliminary mesh 20 with some of the points labelled as part of the epicardium surface 24 that have been coloured in white for illustrative purposes; on the other hand, FIG. 4F shows all the points of the epicardium surface 24 that have been coloured in dark grey and all the points of the endocardium surface 26 that have been coloured in light grey, resulting in surfaces that visually are uniformly coloured.

More in details, the endocardium surface 26 comprises a left ventricular endocardium surface and a right ventricular endocardium surface, shown in FIG. 4G with the respective reference numbers 26*a* and 26*b*. The left ventricular endocardium surface 26*a* is the portion of the endocardium surface 26 that corresponds to the left ventricle of the heart, while the right ventricular endocardium surface 26*b* is the portion of the endocardium surface 26 that corresponds to the right ventricle of the heart.

In step S05, also the left ventricular endocardium surface 26*a* and the right ventricular endocardium surface 26*b* are determined. In particular, the endocardium surface 26 is divided into the left ventricular endocardium surface 26*a* and the right ventricular endocardium surface 26*b* through a connectivity filter (e.g., https://docs.pyvista.org/api/core/_autosummary/pyvista.UniformGridFilters.connectivity.html. In fact, by applying the connectivity filter to the endocardium surface 26, two separated surfaces (i.e., 26*a* and 26*b*) are obtained. The surface having the greater area is the surface of the left ventricle whereas the surface having the lower area is the surface of the left ventricle. If the surfaces have equal area, the left ventricle surface can be chosen by maximal coordinate on the OY axis.

In further details, the connectivity filter can work as follows. A first and a second main clusters of points of the endocardium surface 26 are determined. The first and second main clusters correspond respectively to the left ventricular endocardium surface 26*a* and the right ventricular endocardium surface 26*b*. In particular, the first and second main clusters have edges 28*a*-28*c* with annular shape (in the following, also called annular edges), each annular edge 28*a*-28*c* defining a respective opening 28*a*'-28*c*' of the first or second main cluster. The first main cluster has a first annular edge 28*a*, while the second main cluster has a second and a third annular edges 28*b*, 28*c*, according to the representation of the preliminary mesh 20 (these two annular edges 28*b*, 28*c* correspond respectively to the tricuspid valve and the pulmonary valve. In details, the opening 28*a*' has an area greater than an area of each one of the openings 28*b*', 28*c*' of the second main cluster. Therefore, by determining the largest opening among the openings 28*a*'-28*c*' it is possible to detect the annular edge 28*a* corresponding to the left ventricle, and thus to label the first main cluster as the left ventricular endocardium surface 26*a* and the second main cluster as the right ventricular endocardium surface 26*b*.

Therefore, step S05 comprises determining the annular edges 28*a*-28*c* of the left ventricular endocardium surface 26*a* and of the right ventricular endocardium surface 26*b*. In details, the annular edges 28*a*-28*c* are the parts of the left ventricular endocardium surface 26*a* and of the right ventricular endocardium surface 26*b* that extend at the epicardium surface 24, i.e. that have as nearest neighbours points that belong to the epicardium surface 24.

More in details, in order to determine the annular edges 28*a*-28*c* of the left ventricular endocardium surface 26*a* and of the right ventricular endocardium surface 26*b*, endocardium edge points of the left ventricular endocardium surface 26*a* and of the right ventricular endocardium surface 26*b* are selected among the points of, respectively, the left ventricular endocardium surface 26*a* and the right ventricular endocardium surface 26*b*. For illustrative purposes, the endocardium edge points are shown in FIG. 4I with the reference number 30. Each endocardium edge point 30 has a number of nearest neighbour points of the respective ventricular endocardium surface 26*a*, 26*b* that is lower than a neighbour point threshold number. For example, the neighbour point threshold number is equal to the number of nearest neighbour points of a point in the considered mesh, which is equal to six in the considered case of a triangular mesh. Therefore, each point of the ventricular endocardium surface 26*a*, 26*b* that has at least one nearest neighbour point that does not belong to the ventricular endocardium surface 26*a*, 26*b* (i.e., that belongs to the epicardium surface 24) is an endocardium edge point 30. In other words, each endocardium edge point 30 belongs to some mesh edge that is part of only one triangle. The set of the endocardium edge points 30 of the left ventricular endocardium surface 26*a* define the annular edge 28*a* of the left ventricular endocardium surface 26*a*, while the endocardium edge points 30 of the right ventricular endocardium surface 26*b* define the annular edges 28*b*, 28*c* of the right ventricular endocardium surface 26*b*.

Additionally and optionally, at step S05 the epicardium surface 26*a* can also be filtered in order to remove points of the preliminary mesh 20 that have not been classified or that have been erroneously classified as belonging to the endocardium surface 26. This improves the accuracy of recognition between the epicardium surface 24 and the endocardium surface 26. This filtering can be performed at any moment of step S05, after the determination of the epicardium surface 26*a*. For illustrative purposes, the filtered epicardium surface 26*a* is shown in FIG. 4H.

In details, in this filtering phase it is verified if any point of the preliminary mesh 20 has not been classified as part of the epicardium surface 24 (i.e., has the respective minimum distance from the convex hull 22 that is greater than the threshold minimum distance) and is isolated from the first and second main clusters of the endocardium surface 26 by means of the epicardium surface 24. Each of these points is considered isolated from the first and second main clusters of the endocardium surface 26 if all its nearest neighbour points in the preliminary mesh 20 are part of the epicardium surface 24, or if it belongs to a secondary cluster of points that are initially labelled as part of the endocardium surface 26 and that are isolated from the first and second main clusters of the endocardium surface 26 (i.e., the nearest neighbour points in the preliminary mesh 20 surrounding the secondary cluster are part of the epicardium surface 24). In case there are one or more points satisfying these conditions, these one or more points are re-labelled as part of the epicardium surface 24.

At a step S07 consecutive to step S05, a heart base portion of the epicardium surface 24 is determined. The heart base portion is shown in FIG. 4J with the reference number 32, in a shade of grey that intermediate between the dark grey of the epicardium surface 24 and the light grey of the endocardium surface 26.

The heart base portion 32 is lateral to the annular edges 28*a*-28*c* of the ventricular endocardium surfaces 26*a*, 26*b* and thus is the part of the epicardium surface 24 that extends at the ventricular endocardium surfaces 26*a*, 26*b*. The heart base portion 32 of the epicardium surface 24 represents the heart base of the heart of the patient (shown in FIG. 4J with the reference number 36).

In particular, the heart base portion 32 is identified by selecting epicardium edge points of the epicardium surface 24, which extend at the endocardium surface 26 (i.e. that are lateral to them). The epicardium edge points are shown in FIG. 4J with the reference number 34. In details, each epicardium edge point 34 has at least one nearest neighbour point of the preliminary mesh 20 that is one of said endocardium edge points 30.

The heart base 36 of the heart may be formed by the only epicardium edge points 34 or by the epicardium edge points 34 and other points of the epicardium surface 24 that extend in proximity to the epicardium edge points 34. For example, the heart base 36 can be formed by the epicardium edge points 34 and by a predefined number of points of the epicardium surface 24 that are neighbours to each other and that extend in the upper part of the heart (i.e., opposite to the heart apex), surrounding the annular edges 28*a*-28*c*. For example, the number of points depends in a per se known way on the size of the preliminary mesh 20 and can be found heuristically so that the obtained heart base 36 of the preliminary mesh 20 matches the anatomical definition of the heart base of the heart.

Therefore, after steps S01-S07 all the points of the preliminary mesh 20 are labelled as belonging to either the epicardium surface 24 or the endocardium surface 26 (in details for the latter case, the left ventricular endocardium surface 26*a* or the right ventricular endocardium surface 26*b*). Moreover, the points corresponding to the heart base 36 are also labelled as belonging to the heart base 36. For example, these data are stored in the preliminary mesh 20 by associating to each point of the preliminary mesh 20 respective indexes indicative of these classifications.

Figures 5A, 5B, 5C, 5D, 5E:
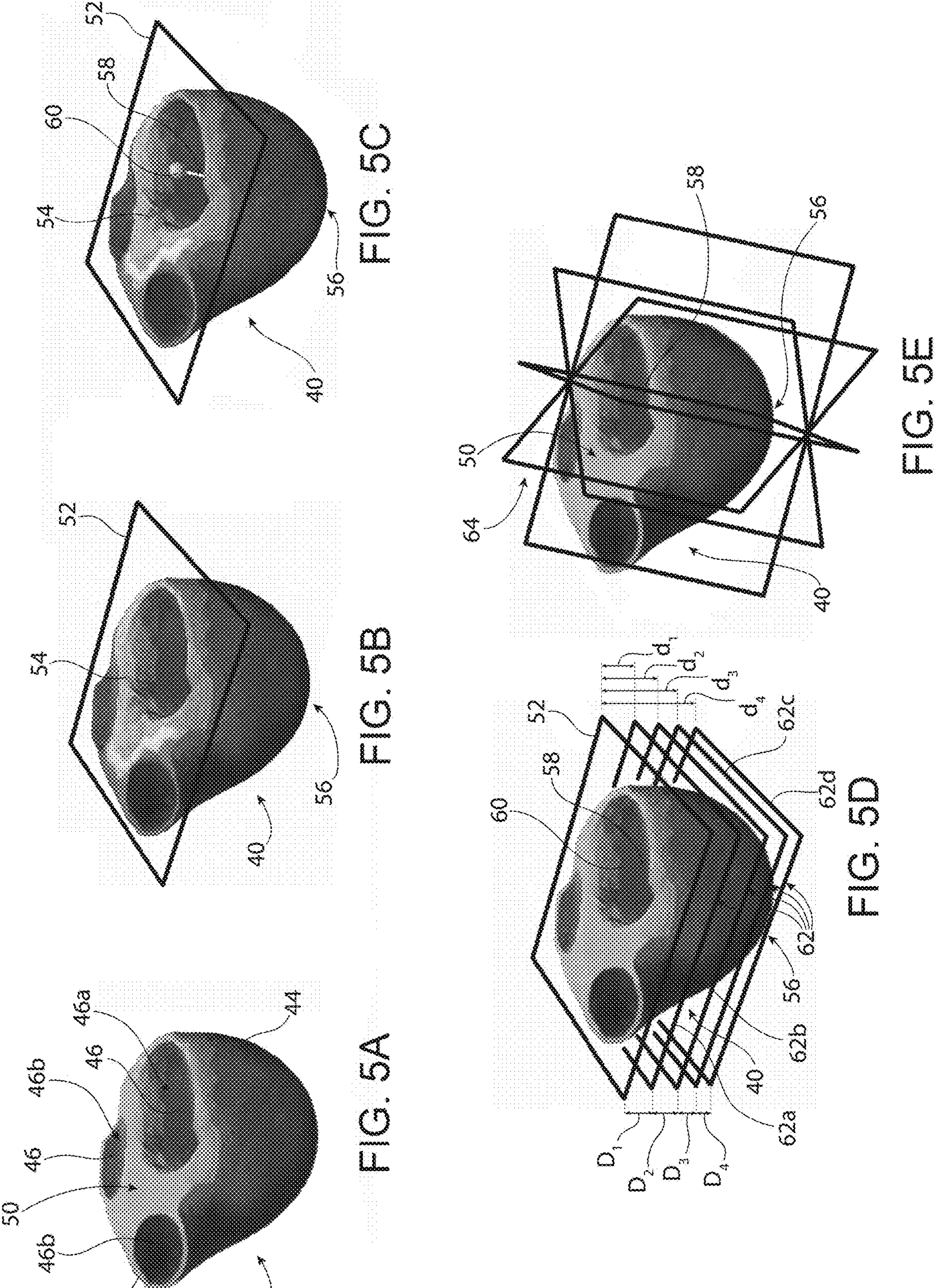

According to an embodiment of the method 100, at a step S09 consecutive to step S07, the device 10 acquires a second mesh of the heart of the patient. The second mesh is also called in the following heart mesh and is shown in FIG. 5A with the reference number 40.

The heart mesh 40 is a 3D graphical representation of the heart of the patient, analogously to the preliminary mesh 20 (i.e., representing the left ventricle, the right ventricle, the heart apex and the heart base of the heart of the patient). Analogously to the preliminary mesh 20, the heart mesh 40 comprises T mesh points extending in a 3D space. Each point is connected to its nearest neighbour points through respective lines, thus forming a multiplicity of cells of the mesh. In particular, the cells of the heart mesh 40 have tetrahedral shape.

In details, according to this embodiment the heart mesh 40 is generated based on the preliminary mesh 20, according to per se known techniques and tools (e.g., through commonly available mesh builder tools). More in details, the heart mesh 40 approximates the preliminary mesh 20 by passing from a triangular-cell mesh to a tetrahedral-cell mesh.

Moreover, the heart mesh 40 includes the information about the epicardium surface, the endocardium surface (in details, the left ventricular endocardium surface and the right ventricular endocardium surface) and the heart base, analogously to the preliminary mesh 20 after step S07. In other words, each point of the heart mesh 40 is labelled as belonging or not to these classifications. In FIG. 5A, the following reference numbers are used: 44 for the epicardium surface, 46 for the endocardium surface (in details, 46*a* for the left ventricular endocardium surface and 46*b* for the right ventricular endocardium surface) and 50 for the heart base. More in general, all the classifications performed on the preliminary mesh 20 and the information acquired from it are also present in the heart mesh 40, due to the correspondence between the heart mesh 40 and the preliminary mesh 20.

According to a different embodiment of the method 100, steps S01-S07 are not performed and, at step S09, the heart mesh 40 is acquired (e.g., from the image acquisition apparatus 14) as already comprising this information about the epicardium surface, the endocardium surface (in details, the left ventricular endocardium surface and the right ventricular endocardium surface) and the heart base. For example, the mesh generated by the image acquisition apparatus 14 can be visually examined by a physician and its points can be manually classified and labelled based on his experience. Therefore, all the classifications previously described with reference to the preliminary mesh 20 and the information acquired from it are also present in the heart mesh 40.

At a step S11 consecutive to step S09, a heart base plane corresponding to the heart base 50 is determined. The heart base plane is shown in FIG. 5B with the reference number 52. In details, the heart base plane 52 extends at the heart base 50 (e.g., the heart base 50 lays on it) and thus identifies it.

In particular, a left ventricular portion 54 of the heart base 50 of the heart mesh 40 is determined. The left ventricular portion 54 is a portion of the heart base 50 that extends at the left ventricle of the heart. The left ventricular portion 54 has an annular shape and corresponds to the portion of the epicardium surface 24 surrounding the first annular edge 28*a* of the left ventricular endocardium surface 26*a*. Then, the heart base plane 52 is determined by applying to the left ventricular portion 54 of the heart base 50 a machine learning-based dimensionality reduction technique. For example, the left ventricular portion 54 can be processed by means of principal component analysis, PCA, to determine the heart base plane 52 that approximates in the optimal way the points of the left ventricular portion 54; in details, PCA has the advantages of being the most suitable for working with 3D coordinates and of being implemented in some open-source libraries, for example in the scikit-image library https://scikit-learn.org/stable/modules/generated/sklearn.decomposition.PCA.html#sklearn.decomposition.PCA. Alternatively, the heart base plane 52 can be determined through linear discriminant analysis (LDA) (Izenman, Alan Julian. "*Linear discriminant analysis." Modern multivariate statistical techniques*. Springer, New York, NY, 2013. 237-280), SVD (Wall, Michael E., Andreas Rechtsteiner, and Luis M. Rocha. "*Singular value decomposition and principal component analysis." A practical approach to microarray data analysis*. Springer, Boston, MA, 2003. 91-109), autoencoder (Ng, Andrew. "*Sparse autoencoder*." CS294A Lecture notes 72.2011 (2011): 1-19, https://en.wikipedia.org/wiki/Autoencoder) or other nonlinear variations of the PCA.

At a step S13 (optional) consecutive to step S11, the heart apex 56 is identified in the heart mesh 40. In details, the heart apex 56 is the portion of the heart mesh 40 that is opposite to the heart base 50 with respect to the heart mesh 40, and is shown in FIG. 5B. For example, the heart apex 56 can include the extremal point (apex point) of the heart mesh 40, opposite to the heart base 50 in a direction orthogonal to the heart base plane 52. Moreover, the heart apex 56 can also include a predefined number of other points of the heart mesh 40 (e.g., of its epicardium surface) that are neighbours to each other and that extend in the lower part of the heart (i.e., opposite to the heart base 50), surrounding said extremal point of the heart mesh 40. For example, the number of points depends in a per se known way on the size of the heart mesh 40 and can be found heuristically so that the obtained heart apex 56 of the heart mesh 40 matches the anatomical definition of heart apex of the heart.

In particular, the identification of the heart apex 56 comprises identifying one or more apex points of the heart mesh 40. In details, considering that each point of the heart mesh 40 has a respective minimum distance from the heart base 50 (e.g., measured from the heart base plane 52, orthogonally to it), the one or more apex points are selected in the heart mesh 40 as the points whose minimum distance from the heart base 50 is the greatest one among the minimum distances from the heart base 50 of all the points of the heart mesh 40.

More in details, step S13 can also be performed in a different order in the method 100, e.g. later on in the method 100; moreover, this step can be analogously executed previously, on the preliminary mesh 20.

At a step S15 consecutive to step S13, a left ventricular axis is identified in the heart mesh 40. The left ventricular axis is identified in FIG. 5C with the reference number 58. The left ventricular axis 58 extends across the left ventricle of the heart mesh 40, from the heart apex 56 to the heart base 50.

In details, in order to identify the left ventricular axis 58, a centroid 60 of the left ventricular portion 54 of the heart base 50 is determined. The centroid 60 extends in the heart base plane 52 and is the centre of mass of the left ventricular portion 54. Then, the left ventricular axis 58 is determined, as the axis passing through the centroid 60 and the heart apex 56 of the heart mesh 40, transversely to the heart base plane 52. For example, the left ventricular axis 58 joins the apex point of the heart apex 56 and the centroid 60 of the left ventricular portion 54.

At a step S17 consecutive to step S15, a plurality of distance segmenting planes are determined in the heart mesh 40. The distance segmenting planes are identified in FIG. 5D with the reference number 62.

The distance segmenting planes 62 extend across the heart mesh 40 and are parallel to the heart base plane 52. In other words, the distance segmenting planes 62 extend from the heart base plane 52 to the heart apex 56 so as to be parallel to the heart base plane 52 and to each other. Therefore, each distance segmenting plane 62 has a respective distance from the heart base plane 52 (e.g., measured orthogonally to the heart base plane 52), which is different from the distance of the other distance segmenting planes 62 from the heart base plane 52. Each couple of distance segmenting plane 62 that are consecutive between them in the plurality of distance segmenting planes 62, orthogonally to the heart base plane 52, define a respective distance range from the heart base plane 52. In particular, each distance range is comprised, orthogonally to the heart base plane 52, between the respective distance segmenting planes 62 that delimit it (or between the heart base plane 52 and the first distance segmenting plane 62). For example, if $d_i$ and $d_{i+1}$ are the distances from the heart base plane 52 of the i-th and the (i+1)-th distance segmenting planes 62 (with $d_{i+1}>d_i$), the distance range Di defined between the i-th and the (i+1)-th distance segmenting planes 62 is $D_i=d_{i+1}-d_i$.

In particular, the distance segmenting planes 62 comprise at least a first distance segmenting plane 62*a*, a second distance segmenting plane 62*b*, a third distance segmenting plane 62*c* and a fourth distance segmenting plane 62*d*. The first distance segmenting plane 62*a* extends at a first distance $d_1$ from the heart base plane 52. The second distance segmenting plane 62*b* extends at a second distance $d_2$ from the heart base plane 52, greater than the first distance $d_1$. The third distance segmenting plane 62*c* extends at a third distance $d_3$ from the heart base plane 52, greater than the second distance $d_2$. The fourth distance segmenting plane 62*d* extends at a fourth distance $d_4$ from the heart base plane 52, greater than the third distance $d_3$ and corresponding to the heart apex 56 (i.e., passing through the heart apex 56). Orthogonally to the heart base plane 52, a first distance range $D_1$ is defined between the heart base plane 52 and the first distance segmenting plane 62*a*, a second distance range $D_2$ is defined between the first distance segmenting plane 62*a* and the second distance segmenting plane 62*b*, a third distance range $D_3$ is defined between the second distance segmenting plane 62*b* and the third distance segmenting plane 62*c*, and a fourth distance range $D_4$ is defined between the third distance segmenting plane 62*c* and the fourth distance segmenting plane 62*d*. In other words, the first distance range $D_1$ to the fourth distance range $D_4$ extend, consecutively and in continuity among them, from the heart base plane to the heart apex.

Figure 1B:
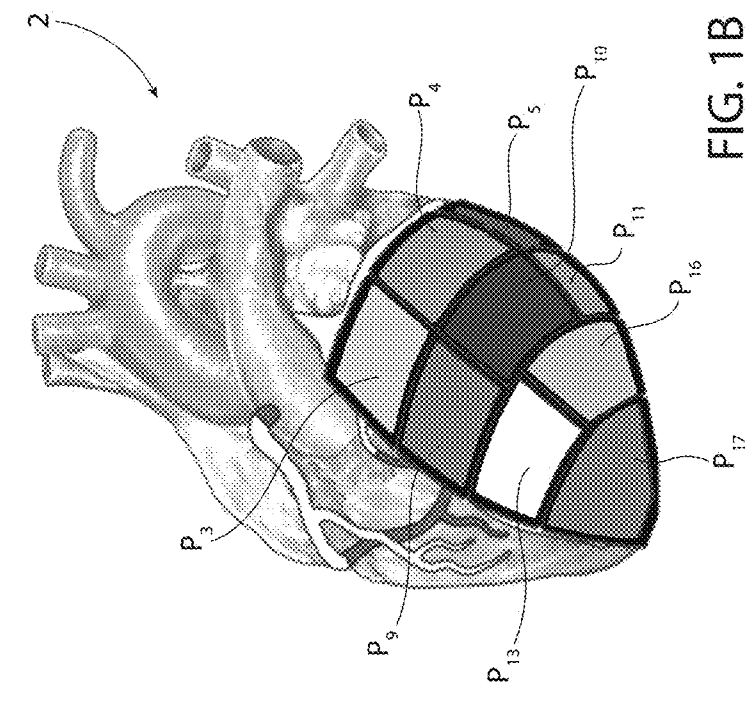
FIG. 1B is a perspective view of a schematic 3D graphical representation of the heart of the patient, based on the known model of FIG. 1A.
Figure 1A:
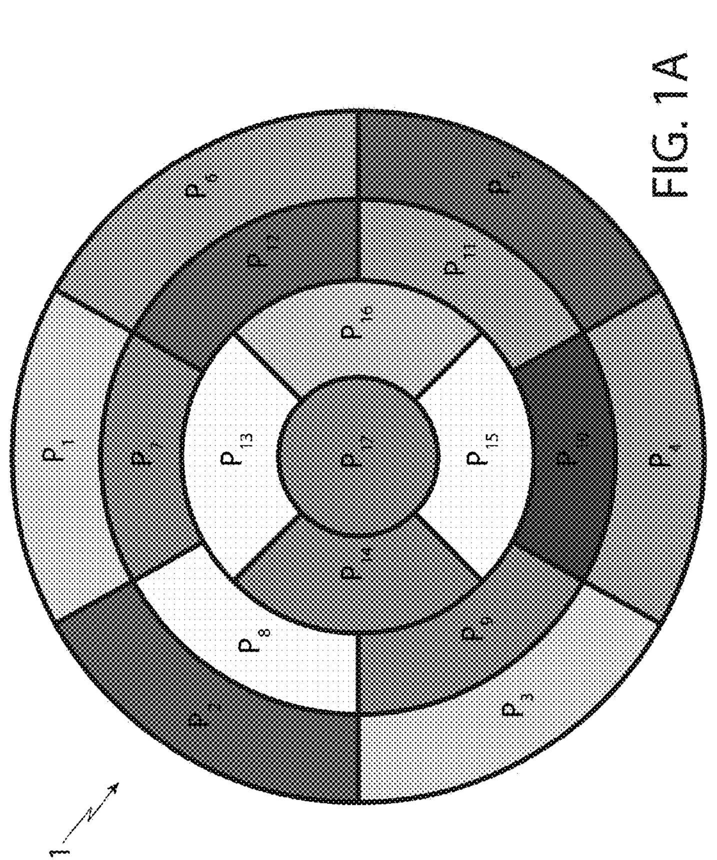
FIG. 1A shows a 2D model of the heart of a patient, of a per se know type and including seventeen segmented regions of the heart.

According to an exemplary and non-limiting embodiment and considering a normalized distance scale uniformly varying from 0 (corresponding to the heart apex 56) to 1 (corresponding to the heart base plane 52), the first distance $d_1$ corresponds to the heart's basal part, the second distance $d_2$ corresponds to heart's mid-cavity part, the third distance $d_3$ corresponds to heart's apical part, and the fourth distance $d_4$ corresponds to the heart apex 56. Further details about these anatomical definitions can be found in https://ecg-waves.com/topic/left-ventricular-segments-echocardiography-cardiac-imaging/, for example in FIG. 1. For example, $D_1=D_2=D_3=D_4=0.25$ and thus $d_1=0.25$, $d_2=0.5$, $d_3=0.75$, $d_4=1$.

At a step S19 consecutive to step S17, a plurality of angle segmenting planes are determined in the heart mesh 40. The angle segmenting planes are identified in FIG. 5E with the reference number 64.

The angle segmenting planes 64 extend across the heart mesh 40 and form a bundle of planes sharing a same axis, i.e., the left ventricular axis 58 that lays on each one of the angle segmenting planes 64. In other words, the intersection of the angle segmenting planes 64 is the left ventricular axis 58. The angle segmenting planes 64 define among them respective circumferential angular ranges, measured about the left ventricular axis 58. In particular, each circumferential angular range is comprised between two respective angle segmenting planes 64 that delimit it.

Figure 6:
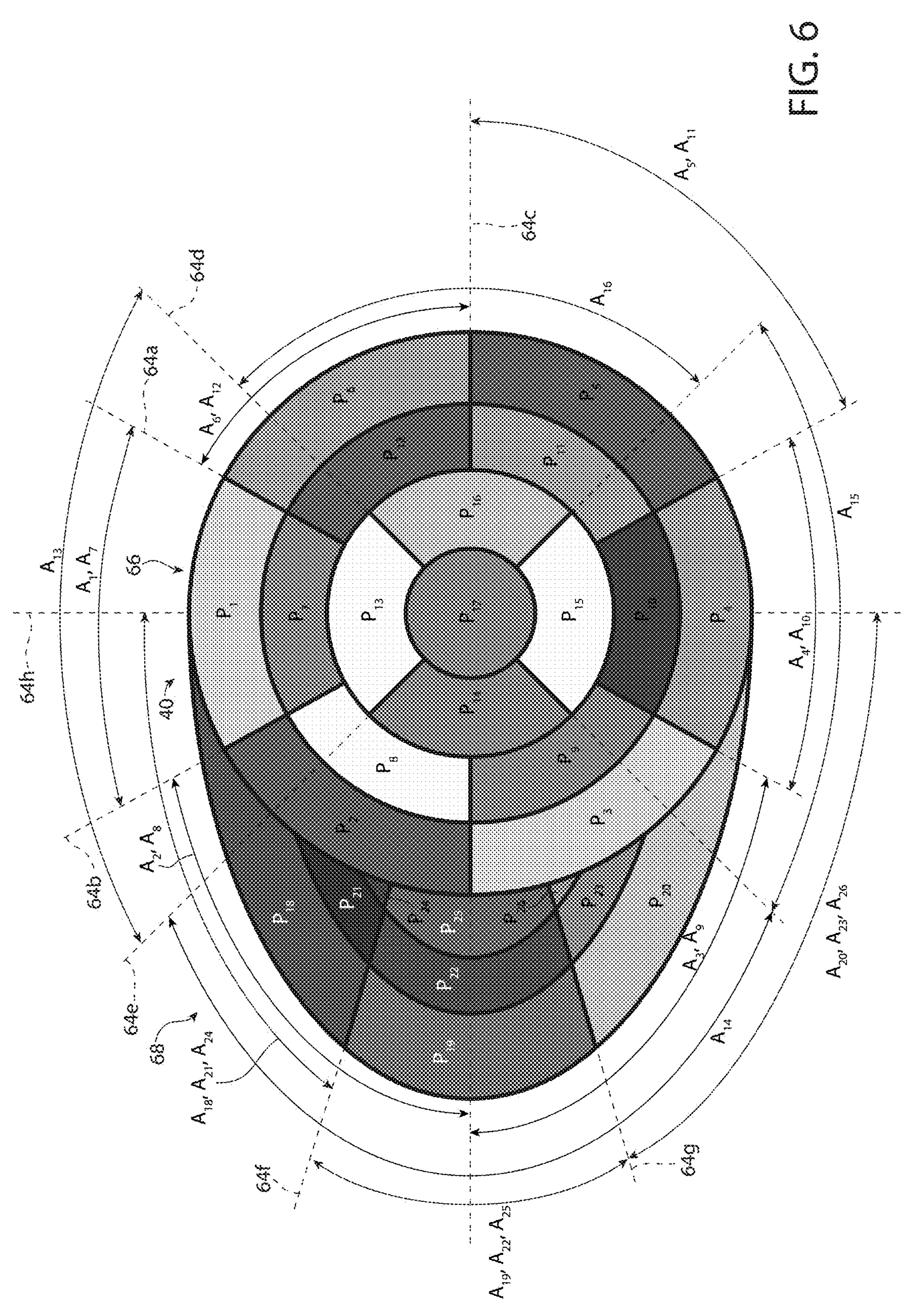
FIG. 6 shows a 2D model of the heart of a patient, including twenty-six segmented regions of the heart, according to an embodiment of the present invention.

According to an embodiment better shown in FIG. 6 (a schematic top view of the heart mesh 40, for example taken parallel to the heart base plane 52), the angle segmenting planes 64 comprise at least a first angle segmenting plane 62*a* to an eighth angle segmenting plane 64*h*. In details, the angle segmenting planes 64 have, counterclock wisely about the left ventricular axis 58 and starting exemplarily from the interface between the fifth and the sixth segmented regions $P_5$, $P_6$ (i.e., the extremal point opposite to the right ventricle), the following order: 64*c*, 64*d*, 64*a*, 64*h*, 64*b*, 64*e*, 64*f*, 64*g*. In further details, the third angle segmenting plane 62*c* extends across the right and left ventricle (ideally as a symmetry plane for the heart, i.e. the heart is ideally plane symmetrical with respect to the third angle segmenting plane 62*c*) and the eighth angle segmenting plane 64*h* is perpendicular to the third angle segmenting plane 62*c* orthogonally to the left ventricular axis 58.

As better discussed in the following, FIG. 6 shows the left ventricle 66 and the right ventricle 68 of the heart mesh 40, in particular divided and classified in segmented regions $P_1$-$P_{26}$ of the heart mesh 40 better discussed in the following.

As shown in the embodiment of FIG. 6, the following circumferential angular ranges are determined corresponding to the left ventricle 66:

a first circumferential angular range $A_1$ to a sixth circumferential angular range $A_6$ are circumferentially consecutive among them along the total circumferential angular range of 360° about the left ventricular axis 58 (in details, counterclockwisely), wherein the first circumferential angular range $A_1$ is defined between the first angle segmenting plane 64*a* and the second angle segmenting plane 64*b*, the second circumferential angular range $A_2$ is defined between the second angle segmenting plane 64*b* and the third angle segmenting plane 64*c*, the third circumferential angular range $A_3$ is defined between the third angle segmenting plane 64*c* and the first angle segmenting plane 64*a*, the fourth circumferential angular range $A_4$ is defined between the first angle segmenting plane 64*a* and the second angle segmenting plane 64*b* (opposite to the first circumferential angular range $A_1$ with respect to the left ventricular axis 58), the fifth circumferential angular range $A_5$ is defined between the second angle segmenting plane 64*b* and the third angle segmenting plane 64*c* (opposite to the second circumferential angular range $A_2$ with respect to the left ventricular axis 58), and the sixth circumferential angular range $A_6$ is defined between the third angle segmenting plane 64*c* and the first angle segmenting plane 64*a* (opposite to the third circumferential angular range $A_3$ with respect to the left ventricular axis 58);

a seventh circumferential angular range $A_7$ to a twelfth circumferential angular range $A_{12}$ are circumferentially consecutive among them along the total circumferential angular range of 360° about the left ventricular axis 58 (in details, counterclockwisely) and angularly correspond, respectively, to the first circumferential angular range $A_1$ to the sixth circumferential angular range $A_6$ (i.e., are defined by the same angle segmenting planes 64);

a thirteenth circumferential angular range $A_{13}$ to a sixteenth circumferential angular range $A_{16}$ are circumferentially consecutive among them along the total circumferential angular range of 360° about the left ventricular axis 58 (in details, counterclockwisely), wherein the thirteenth circumferential angular range $A_{13}$ is defined between the fourth angle segmenting plane 64*d* and the fifth angle segmenting plane 64*e*, the fourteenth circumferential angular range $A_{14}$ is defined between the fifth angle segmenting plane 64*e* and the fourth angle segmenting plane 64*d*, the fifteenth circumferential angular range $A_{15}$ is defined between the fourth angle segmenting plane 64*d* and the fifth angle segmenting plane 64*e* (opposite to the thirteenth circumferential angular range $A_{13}$ with respect to the left ventricular axis 58), and the sixteenth circumferential angular range $A_{16}$ is defined between the fifth angle segmenting plane 64*e* and the fourth angle segmenting plane 64*d* (opposite to the fourteenth circumferential angular range $A_{14}$ with respect to the left ventricular axis 58); and a seventeenth circumferential angular range $A_{17}$ covering the total circumferential angular range of 360° about the left ventricular axis 58.

Moreover, as shown in the embodiment of FIG. 6, the following circumferential angular ranges are determined corresponding to the right ventricle 68:

an eighteenth circumferential angular range $A_{18}$ to a twentieth circumferential angular range $A_{20}$ are circumferentially consecutive among them along a partial circumferential angular range (smaller than 360° and for example comprising the second circumferential angular range $A_2$ and the third circumferential angular range $A_3$ and, partially, the first circumferential angular range $A_1$ and the fourth circumferential angular range $A_4$; in details, the partial circumferential angular range is comprised between $\pi/2$ and $-\pi/2$ in the angular scale in radians, better discussed in the following), wherein the eighteenth circumferential angular range $A_{18}$ is defined between the eighth angle segmenting plane 64*h* and the sixth angle segmenting plane 64*f*, the nineteenth circumferential angular range $A_{19}$ is defined between the sixth angle segmenting plane 64*f* and the seventh angle segmenting plane 64*g*, the twentieth circumferential angular range $A_{20}$ is defined between the seventh angle segmenting plane 64*g* and the eighth angle segmenting plane 64*h;* a twenty-first circumferential angular range $A_{21}$ to a twenty-third circumferential angular range $A_{23}$ are circumferentially consecutive among them along the partial circumferential angular range, wherein the twenty-first circumferential angular range $A_{21}$ is defined between the eighth angle segmenting plane 64*h* and the sixth angle segmenting plane 64*f*, the twenty-second circumferential angular range $A_{22}$ is defined between the sixth angle segmenting plane 64_f_ and the seventh angle segmenting plane 64_g_, the twenty-third circumferential angular range $A_{23}$ is defined between the seventh angle segmenting plane 64_g_ and the eighth angle segmenting plane 64_h_ (thus, the twenty-first circumferential angular range $A_{21}$ to the twenty-third circumferential angular range $A_{23}$ respectively coincide with the eighteenth circumferential angular range $A_{18}$ to the twentieth circumferential angular range $A_{20}$); and a twenty-fourth circumferential angular range $A_{24}$ to a twenty-sixth circumferential angular range $A_{26}$ are circumferentially consecutive among them along the partial circumferential angular range, wherein the twenty-fourth circumferential angular range $A_{24}$ is defined between the eighth angle segmenting plane 64_h_ and the sixth angle segmenting plane 64_f_, the twenty-fifth circumferential angular range $A_{25}$ is defined between the sixth angle segmenting plane 64_f_ and the seventh angle segmenting plane 64_g_, the twenty-sixth circumferential angular range $A_{26}$ is defined between the seventh angle segmenting plane 64_g_ and the eighth angle segmenting plane 64_h_ (thus, the twenty-fourth circumferential angular range $A_{24}$ to the twenty-sixth circumferential angular range $A_{26}$ respectively coincide with the eighteenth circumferential angular range $A_{18}$ to the twentieth circumferential angular range $A_{20}$).

For example, the first circumferential angular range $A_1$ to the sixth circumferential angular range $A_6$ have a same angular value between them.

In the embodiment of FIG. 6, the seventh circumferential angular range $A_7$ to the twelfth circumferential angular range $A_{12}$ coincide, respectively, with the first circumferential angular range $A_1$ to the sixth circumferential angular range $A_6$. For example, the thirteenth circumferential angular range $A_{13}$ comprises the seventh circumferential angular range $A_7$ and, partially, the eighth circumferential angular range $A_8$ and the twelfth circumferential angular range $A_{12}$; the fourteenth circumferential angular range $A_{14}$ comprises partially the eighth circumferential angular range $A_8$ and the ninth circumferential angular range $A_9$; the fifteenth circumferential angular range $A_{15}$ comprises the tenth circumferential angular range $A_{10}$ and, partially, the ninth circumferential angular range $A_9$ and the eleventh circumferential angular range $A_{11}$; and the sixteenth circumferential angular range $A_{16}$ comprises the eleventh circumferential angular range $A_{11}$ and the twelfth circumferential angular range $A_{12}$.

According to an exemplary and non-limiting embodiment and considering an angular scale measured in radians (where 0 corresponds to the positive semi-axis of the third angle segmenting plane 64_c_, i.e. its right part extending opposite to the right ventricle, and π corresponds to the negative semi-axis of the third angle segmenting plane 64_c_, i.e. its left part extending across the right ventricle), the circumferential angular ranges 64 are defined as follows:

$A_1$ is comprised between $\pi/3$ and $2\pi/3$;
$A_2$ is comprised between $2\pi/3$ and $\pi$;
$A_3$ is comprised between $\pi$ and $-2\pi/3$;
$A_4$ is comprised between $-2\pi/3$ and $-\pi/3$;
$A_5$ is comprised between $-\pi/3$ and 0;
$A_6$ is comprised between 0 and $\pi/3$;
$A_7$ is comprised between $\pi/3$ and $2\pi/3$;
$A_8$ is comprised between $2\pi/3$ and $\pi$;
$A_9$ is comprised between $\pi$ and $-2\pi/3$;
$A_{10}$ is comprised between $-2\pi/3$ and $-\pi/3$;
$A_{11}$ is comprised between $-\pi/3$ and 0;
$A_{12}$ is comprised between 0 and $\pi/3$;
$A_{13}$ is comprised between $\pi/4$ and $3\pi/4$;
$A_{14}$ is comprised between $3\pi/4$ and $-3\pi/4$;
$A_{15}$ is comprised between $-3\pi/4$ and $-\pi/4$;
$A_{16}$ is comprised between $-\pi/4$ and $\pi/4$;
$A_{17}$ is comprised between 0 and $2\pi$;
$A_{18}$ is comprised between $\pi/2$ and $5\pi/6$;
$A_{19}$ is comprised between $5\pi/6$ and $-5\pi/6$;
$A_{20}$ is comprised between $-5\pi/6$ and $-\pi/2$;
$A_{21}$ is comprised between $\pi/2$ and $5\pi/6$;
$A_{22}$ is comprised between $5\pi/6$ and $-5\pi/6$;
$A_{23}$ is comprised between $-5\pi/6$ and $-\pi/2$;
$A_{24}$ is comprised between $\pi/2$ and $5\pi/6$;
$A_{25}$ is comprised between $5\pi/6$ and $-5\pi/6$;
$A_{26}$ is comprised between $-5\pi/6$ and $-\pi/2$.

In particular, these ranges are considered counterclockwisely and, for example, the first extremal value of each range is comprised in the range while the second extremal value is excluded from the range.

In details, steps S17 and S19 are optional and can be carried out also in a different order in the method 100, e.g. later on in the method 100.

Figures 5F, 5G, 5H, 5I, 5J, 5K:
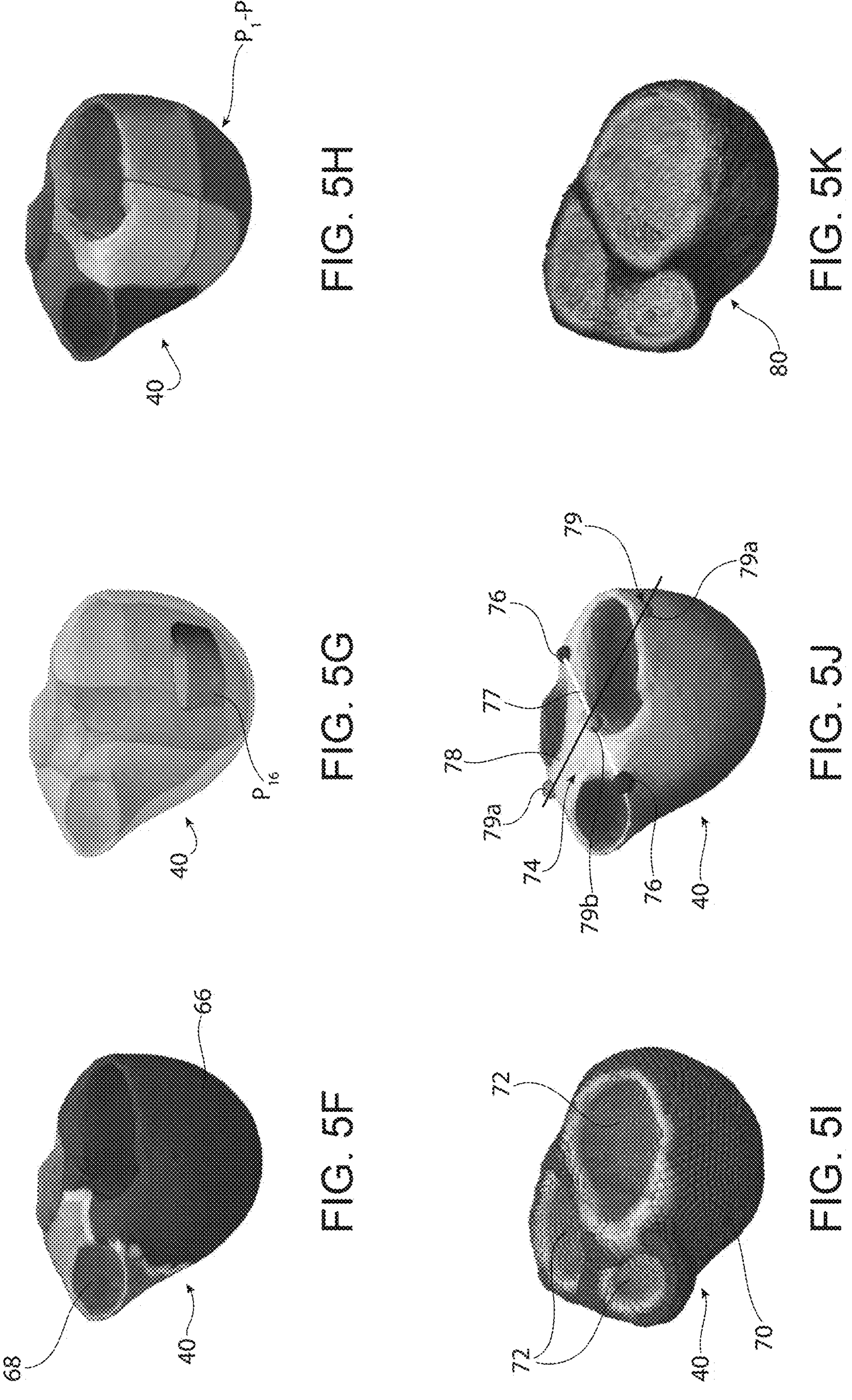

At a step S21 (optional) consecutive to step S19, the left ventricle 66 and the right ventricle 68 of the heart mesh 40 are identified based on the left ventricular endocardium surface 26_a_ and the right ventricular endocardium surface 26_b_ of the preliminary mesh 20 (FIG. 5F, wherein the left ventricular endocardium surface 26_a_ is in dark grey and the right ventricular endocardium surface 26_b_ is in light grey).

In details, the based on the left ventricular endocardium surface 26_a_ and the right ventricular endocardium surface 26_b_ of the preliminary mesh 20, a left ventricular endocardium surface (not shown) and a right ventricular endocardium surface (not shown) of the heart mesh 40 are determined. This is done in a per se known way, considering that the heart mesh 40 is designed to approximate the preliminary mesh 20. Then, the heart mesh 40 is subdivided in the left and right ventricle 66, 68 based on the left and right ventricular endocardium surfaces of the heart mesh 40. For example, this can be done by labelling each point of the heart mesh 40 as belonging to the left or right ventricle 66, 68 based on the respective proximity of this point to the left and right ventricular endocardium surfaces of the heart mesh 40 (e.g., if this point is closer to the left ventricular endocardium surface of the heart mesh 40 is labelled as belonging to the left ventricle 66). For example, each point of the heart mesh 40 is labelled with a respective value (also called ventricle value) indicative of its belonging to the left or right ventricle 66, 68 (e.g., 0 for left ventricle 66 and 1 for right ventricle 68).

In details, step S21 is optional and can be carried out also in a different order in the method 100, e.g. at any moment after step S09. Moreover, this step can be analogously implemented also on the preliminary mesh 20 to identify the left and right ventricles.

At a step S23 consecutive to step S21, the segmented regions $P_1$-$P_{26}$ are identified by using the heart base plane 52 and the left ventricular axis 58. In details, each segmented region $P_1$-$P_{26}$ is a respective portion of the heart mesh 40 that satisfies a respective first criterion about the distance range from the heart base plane 52 and a respective second criterion about the circumferential angular range about the left ventricular axis 58. The segmented regions $P_1$-$P_{26}$ are indicative of both the left ventricle 66 and the right ventricle 68 of the heart mesh 40. In other words, the whole heart mesh 40 (i.e., not only its left ventricle 66 but also the right ventricle 68) is split into these segmented regions $P_1$-$P_{26}$.

In particular, the plurality of segmented regions $P_1$-$P_{26}$ comprises twenty-six segmented regions, part of them corresponding to the left ventricle 66 (in details, according to the known AHA model) and part of them corresponding to the right ventricle 68.

In details and as better shown in FIG. 6, the segmented regions $P_1$-$P_{26}$ comprise:

- a first segmented region $P_1$ to a sixth segmented region $P_6$ having the first distance range $D_1$ from the heart base plane 52 and having respectively the first circumferential angular range $A_1$ to the sixth circumferential angular range $A_6$;
- a seventh segmented region $P_7$ to a twelfth segmented region $P_{12}$ having the second distance range $D_2$ from the heart base plane 52 and having respectively the seventh circumferential angular range $A_7$ to the twelfth circumferential angular range $A_{12}$;
- a thirteenth segmented region $P_{13}$ to a sixteenth segmented region $P_{16}$ having the third distance range $D_3$ from the heart base plane 52 and having respectively the thirteenth circumferential angular range $A_{13}$ to the sixteenth circumferential angular range $A_{16}$;
- a seventeenth segmented region $P_{17}$ having the fourth distance range $D_4$ from the heart base plane 52 and having the seventeenth circumferential angular range $A_{17}$;
- an eighteenth segmented region $P_{18}$ to a twentieth segmented region $P_{20}$ having the first distance range $D_1$ from the heart base plane 52 and having respectively the eighteenth circumferential angular range $A_{18}$ to the twentieth circumferential angular range $A_{20}$;
- a twenty-first segmented region $P_{21}$ to a twenty-third segmented region $P_{23}$ having the second distance range $D_2$ from the heart base plane 52 and having respectively the twenty-first circumferential angular range $A_{21}$ to the twenty-third circumferential angular range $A_{23}$; and
- a twenty-fourth segmented region $P_{24}$ to a twenty-sixth segmented region $P_{26}$ having the third distance range $D_3$ from the heart base plane 52 and having respectively the twenty-fourth circumferential angular range $A_{24}$ to the twenty-sixth circumferential angular range $A_{26}$.

In details, the first segmented region $P_1$ to the seventeenth segmented region $P_{17}$ correspond to the left ventricle 66 and the eighteenth segmented region $P_{18}$ to the twenty-sixth segmented region $P_{26}$ correspond to the right ventricle 68.

For example and with the additional reference to table 2 of https://ecgwaves.com/topic/left-ventricular-segments-echocardiography-cardiac-imaging/or Romero, D. A., et al. "Modeling the influence of the VV delay for CRT on the electrical activation patterns in absence of conduction through the AV node." Medical Imaging 2008: Visualization, Image-Guided Procedures, and Modeling. Vol. 6918. SPIE, 2008, $P_1$ corresponds to the basal anterior, $P_2$ corresponds to the basal anteroseptal, $P_3$ corresponds to the basal inferoseptal, $P_4$ corresponds to the basal inferior, $P_5$ corresponds to the basal inferolateral, $P_6$ corresponds to the basal anterolateral, $P_7$ corresponds to the mid anterior, $P_8$ corresponds to the mid anteroseptal, $P_9$ corresponds to the mid inferoseptal, $P_{10}$ corresponds to the mid inferior, $P_{11}$ corresponds to the mid inferolateral, $P_{12}$ corresponds to the mid anterolateral, $P_{13}$ corresponds to the apical anterior, $P_{14}$ corresponds to the apical septal, $P_{15}$ corresponds to the apical inferior, $P_{16}$ corresponds to the apical lateral, $P_{17}$ corresponds to the apex. Moreover and with the additional reference to Plaisier, A. S., et al. "Image quality assessment of the right ventricle with three different delayed enhancement sequences in patients suspected of ARVC/D." The international journal of cardiovascular imaging 28.3 (2012): 595-601, to Nestaas, Eirik, et al. "Tissue Doppler derived longitudinal strain and strain rate during the first 3 days of life in healthy term neonates." Pediatric Research 65.3 (2009): 357-362, to FIGS. 2 and 4 of https://www.science.org/doi/10.1126/sciadv.abi8020 and to Shade, Julie K., et al. "Predicting risk of sudden cardiac death in patients with cardiac sarcoidosis using multimodality imaging and personalized heart modeling in a multivariable classifier." Science Advances 7.31 (2021): eabi8020, $P_{18}$, $P_{21}$ and $P_{24}$ correspond to right superior segments, $P_{19}$, $P_{22}$ and $P_{25}$ correspond to right lateral segments, $P_{20}$, $P_{23}$, $P_{26}$ correspond to right inferior segments.

Therefore, at step S23 each segmented region is identified as the 3D portion of the heart mesh 40 satisfying both the respective first and second criterion. FIG. 5G shows the phase of identifying one of the segmented regions (e.g., $P_{16}$) while FIG. 5H shows the heart mesh 40 subdivided in all the segmented regions $P_1$-$P_{26}$.

According to the exemplary and non-limiting embodiment previously considered, the segmented regions $P_1$-$P_{26}$ comprise:

- the first segmented region $P_1$ whose first distance range $D_1$ from the heart base plane 52 is comprised in normalized values between 0 and 0.25 and whose first circumferential angular range $A_1$ is comprised between $\pi/3$ and $2\pi/3$;
- the second segmented region $P_2$ whose first distance range $D_1$ from the heart base plane 52 is comprised in normalized values between 0 and 0.25 and whose first circumferential angular range $A_2$ is comprised between $2\pi/3$ and $\pi$;
- the third segmented region $P_3$ whose first distance range $D_1$ from the heart base plane 52 is comprised in normalized values between 0 and 0.25 and whose first circumferential angular range $A_3$ is comprised between $\pi$ and $-2\pi/3$;
- the fourth segmented region $P_4$ whose first distance range $D_1$ from the heart base plane 52 is comprised in normalized values between 0 and 0.25 and whose first circumferential angular range $A_4$ is comprised between $-2\pi/3$ and $-\pi/3$;
- the fifth segmented region $P_5$ whose first distance range $D_1$ from the heart base plane 52 is comprised in normalized values between 0 and 0.25 and whose first circumferential angular range $A_5$ is comprised between $-\pi/3$ and 0;
- the sixth segmented region $P_6$ whose first distance range $D_1$ from the heart base plane 52 is comprised in normalized values between 0 and 0.25 and whose first circumferential angular range $A_6$ is comprised between 0 and $\pi/3$;
- the seventh segmented region $P_7$ whose second distance range $D_2$ from the heart base plane 52 is comprised in normalized values between 0.25 and 0.5 and whose first circumferential angular range $A_7$ is comprised between $\pi/3$ and $2\pi/3$;
- the eighth segmented region $P_8$ whose second distance range $D_2$ from the heart base plane 52 is comprised in normalized values between 0.25 and 0.5 and whose first circumferential angular range $A_8$ is comprised between $2\pi/3$ and $\pi$;
- the ninth segmented region $P_9$ whose second distance range $D_2$ from the heart base plane 52 is comprised in normalized values between 0.25 and 0.5 and whose first circumferential angular range $A_9$ is comprised between $\pi$ and $-2\pi/3$;
- the tenth segmented region $P_{10}$ whose second distance range $D_2$ from the heart base plane 52 is comprised in normalized values between 0.25 and 0.5 and whose first circumferential angular range $A_{10}$ is comprised between −2π/3 and −π/3;

the eleventh segmented region $P_{11}$ whose second distance range $D_2$ from the heart base plane 52 is comprised in normalized values between 0.25 and 0.5 and whose first circumferential angular range $A_{11}$ is comprised between −π/3 and 0;

the twelfth segmented region $P_{12}$ whose second distance range $D_2$ from the heart base plane 52 is comprised in normalized values between 0.25 and 0.5 and whose first circumferential angular range $A_{12}$ is comprised between 0 and π/3;

the thirteenth segmented region $P_{13}$ whose third distance range $D_3$ from the heart base plane 52 is comprised in normalized values between 0.5 and 0.75 and whose first circumferential angular range $A_{13}$ is comprise d between π/4 and 3π/4;

the fourteenth segmented region $P_{14}$ whose third distance range $D_3$ from the heart base plane 52 is comprised in normalized values between 0.5 and 0.75 and whose first circumferential angular range $A_{14}$ is comprised between 3π/4 and −3π/4;

the fifteenth segmented region $P_{15}$ whose third distance range $D_3$ from the heart base plane 52 is comprised in normalized values between 0.5 and 0.75 and whose first circumferential angular range $A_{15}$ is comprised between −3π/4 and −π/4;

the sixteenth segmented region $P_{16}$ whose third distance range $D_3$ from the heart base plane 52 is comprised in normalized values between 0.5 and 0.75 and whose first circumferential angular range $A_{16}$ is comprised between −π/4 and π/4;

the seventeenth segmented region $P_{17}$ whose fourth distance range $D_4$ from the heart base plane 52 is comprised in normalized values between 0.75 and 1 and whose first circumferential angular range $A_{17}$ is comprised between 0 and 2π;

the eighteenth segmented region $P_{18}$ whose first distance range $D_1$ from the heart base plane 52 is comprised in normalized values between 0 and 0.25 and whose first circumferential angular range $A_{18}$ is comprised between π/2 and 5π/6;

the nineteenth segmented region $P_{19}$ whose first distance range $D_1$ from the heart base plane 52 is comprised in normalized values between 0 and 0.25 and whose first circumferential angular range $A_{19}$ is comprised between 5π/6 and −5π/6;

the twentieth segmented region $P_{20}$ whose first distance range $D_1$ from the heart base plane 52 is comprised in normalized values between 0 and 0.25 and whose first circumferential angular range $A_{20}$ is comprised between −5π/6 and −π/2;

the twenty first segmented region $P_{21}$ whose second distance range $D_2$ from the heart base plane 52 is comprised in normalized values between 0.25 and 0.5 and whose first circumferential angular range $A_{21}$ is comprised between π/2 and 5π/6;

the twenty-second segmented region $P_{22}$ whose second distance range $D_2$ from the heart base plane 52 is comprised in normalized values between 0.25 and 0.5 and whose first circumferential angular range $A_{22}$ is comprised between 5π/6 and −5π/6;

the twenty-third segmented region $P_{23}$ whose second distance range $D_2$ from the heart base plane 52 is comprised in normalized values between 0.25 and 0.5 and whose first circumferential angular range $A_{23}$ is comprised between −5π/6 and −π/2;

the twenty-fourth segmented region $P_{24}$ whose third distance range $D_3$ from the heart base plane 52 is comprised in normalized values between 0.5 and 0.75 and whose first circumferential angular range $A_{24}$ is comprised between π/2 and 5π/6;

the twenty-fifth segmented region $P_{25}$ whose third distance range $D_3$ from the heart base plane 52 is comprised in normalized values between 0.5 and 0.75 and whose first circumferential angular range $A_{25}$ is comprised between 5π/6 and −5π/6;

the twenty-sixth segmented region $P_{26}$ whose third distance range $D_3$ from the heart base plane 52 is comprised in normalized values between 0.5 and 0.75 and whose first circumferential angular range $A_{26}$ is comprised between −5π/6 and −π/2.

At a step S25 consecutive to step S23, an epicardium surface 70 and an endocardium surface 72 of the heart mesh 40 are identified based on the epicardium surface 24 and the endocardium surface 26 of the preliminary mesh 20, as shown in FIG. 5I. This is done in a per se known way, considering that the heart mesh 40 is designed to approximate the preliminary mesh 20, that already has the epicardium surface 24 and the endocardium surface 26 labelled.

At a step S27 consecutive to step S25, the septum 74 of the heart mesh 40 is determined, as shown in FIG. 5J. In details, in order to determine the septum 74, two first reference points 76 of the heart mesh 40 are selected. The first reference points 76 are points of the heart base 50 at the border between the left and right ventricles 66, 68; for example, among the points of the heart base 50 extending at the border between the left and right ventricles 66, 68, the first reference points 76 are chosen as the points with the greatest reciprocal distance among them. Then, a reference axis 77 is determined as the axis passing through both the first reference points 76. Moreover, a septum axis 78 is determined as the axis orthogonal to the reference axis 77 and, for example, extending in the heart base plane 52. For example, three second reference points 79 are determined based on the septum axis 78. In details, the second reference points 79 comprise two extremal second reference points 79*a* that are the points of the heart base 50 through which passes the septum axis 78 and that have the greatest reciprocal distance among them, and a central reference points 79*b* places at the intersection between the septum axis 78 and the reference axis 77. The septum 74 is a portion of the heart base 50 comprising at least the second reference points 79.

At a step S29 consecutive to step S27, a muscle fibre orientation map 80 (FIG. 5K) of the heart of the patient is determined. In details, the muscle fibre orientation map 80 is a per se known 3D graphical representation of the muscle fibre orientation of the heart of the patient. The muscle fibre orientation map 80 is obtained, based on the heart apex 56, the heart base 50, the epicardium surface 70 and the endocardium surface 72 of the heart mesh 40, through per se known techniques such as those exploiting a rule-based approach (for example disclosed in document Bayer, Jason D., et al. "*A novel rule-based algorithm for assigning myocardial fiber orientation to computational heart models.*" *Annals of biomedical engineering* 40.10 (2012): 2243-2254).

In details, steps S25-S29 are optional and can be carried out also in a different order in the method 100, e.g. previously in the method 100.

Figure 7C:
FIGS. 7A-7F are perspective or top views of meshes obtained as outputs of the method of FIG. 3, according to an embodiment of the present invention.
Figure 7F:
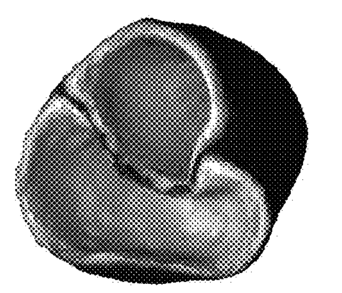

Optionally, transmural coordinates of the heart mesh 40 can be obtained by applying to the heart mesh 40 of step S25 a radial basis function (RBF) interpolation, which associates to each point of the heart mesh 40 a respective value (also called transmural value) uniformly ranging from 0 (correspondent to the heart apex 56, i.e. to the bottom of the epicardium surface 70, shown in black in FIG. 7F) to 1 (correspondent to the bottom part of the endocardium surface 72, shown in white in FIG. 7F). In this case, the points of the heart basis 50 have values of about 0.5.

Figure 7B:
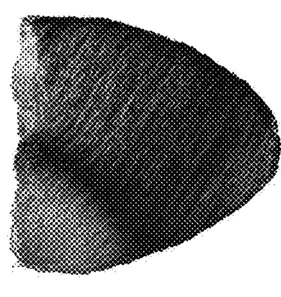

Optionally, the RBF interpolation can also be applied to the heart mesh 40 to obtain apex-base coordinates of the heart of the patient. For example, each point of the heart mesh 40 is associated to a respective value (also called apex-base value) uniformly ranging from 0 (correspondent to the heart apex 56, shown in light grey in FIG. 7D) to 1 (correspondent to the heart base 50, shown in black in FIG. 7D).

Figure 7E:
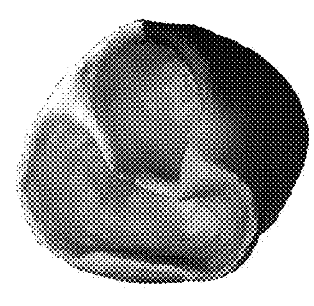

Optionally, the RBF interpolation can also be applied to the heart mesh 40 to obtain angular coordinates of the heart of the patient, about the left ventricular axis 58. For example, each point of the heart mesh 40 is associated to a respective value (also called angular value) uniformly ranging from 0 to $2\pi$, where 0 and $2\pi$ correspond to the centre of heart lateral wall between the fifth segmented region $P_5$ and the sixth segmented region $P_6$ (e.g., see FIG. 3 of https://radiopaedia.org/articles/cardiac-segmentation-model-1?lang=us) and $\pi$ corresponds to the centre of the heart septal wall between the second segmented region $P_2$ and the third segmented region $P_3$ (e.g., see FIG. 3 of https://radiopaedia.org/articles/cardiac-segmentation-model-1?lang=us). In FIG. 7E, the angular coordinates are identified with shades of grey going from light (for 0) to dark (for $2\pi$), so that $\pi$ is identified by an intermediate shade of grey.

The ventricle values, the transmural values, the apex-base values and the angular values form a universal ventricular coordinate (UVC) system of the heart of the patient. Further details about the UVC system can be found for example in document Bayer, Jason, et al. "*Universal ventricular coordinates: A generic framework for describing position within the heart and transferring data." Medical image analysis* 45 (2018): 83-93.

From what has been described and illustrated previously, the advantages of the present invention are evident.

The method 100 is an automatic method for segmenting the whole heart geometry (i.e., both the left and the right ventricle) into segmented regions without the necessity of prior additional meta-information from the heart segmentation (e.g., obtained through CT/MRI) of epicardium and endocardium surfaces, heart apex and heart base location.

In the present method 100, the standard 17-segments AHA model has been expanded and improved to cover the whole heart. In fact, twenty-six segmented regions cover the whole heart geometry, i.e. seventeen segments for the left ventricle and nine segments for the right ventricle. The method allows to recognize the heart base of the heart, construct a universal coordinate system on the heart and select segmented regions based on conditions specified on universal coordinates.

Figure 7A:
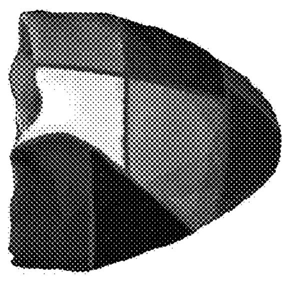
Figure 7D:
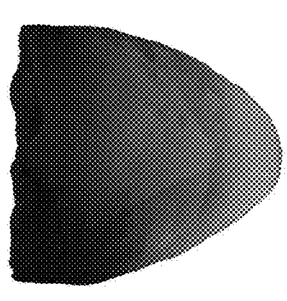

In particular, the method 100 allows to obtain the following information about the heart of the patient: the segmented regions $P_1$-$P_{26}$ (FIG. 7A), the muscle fibre orientation map 80 (FIG. 7B), the ventricle coordinates (FIG. 7C), the apex-base coordinates (FIG. 7D), the angular coordinates (FIG. 7E) and the transmural coordinates (FIG. 7F). Such data are suitable for further mathematical modeling, such as for calculating a cardiac activation map, for processing ECG and for medical visualization.

The method 100 works also in absence of a high-quality segmented heart mesh where the atrial, left/right ventricular endocardium surfaces, aorta, internal blood volume, epicardium surface, heart base and heart apex are already labelled.

The method 100 has the following possible applications: 3D visualization, building of simple fibrosis/scar geometry, automatic calculation of electrical indexes and calculation of personalized activation maps.

Concerning the 3D visualization, nuclear cardiology, echocardiography, cardiovascular magnetic resonance (CMR), cardiac computed tomography (CT), positron emission computed tomography (PET) and coronary angiography are imaging modalities which may measure left ventricle function and these measures may be used in clinical research. For these methods of measurements, the heart geometry is standardized through the existing 17-segments AHA model. However, the AHA model assumes to build segments only for some 2D slices from 3D scans, thus the location of the heart tissue between AHA segments, which does not get into these 2D slices, is unknown. Therefore, marking the whole heart into segmented regions may allow more accurate studies of the ventricular functions. However, splitting 3D heart geometry into 17 segments in accordance with the AHA model is a difficult task in case of manually splitting procedure, so it is time-consuming in clinical practice. The method 100 allows to divide a heart geometry into segmented regions automatically.

Concerning the building of simple fibrosis/scar geometry, in order to plan operations by CRT devices implantation (see for example https://www.bostonscientific.com/en-US/patients/about-your-device/crt-devices/how-crts-work.html), it is useful to know the localization of fibrosis/scar prior to the CRT implantation procedure because the location of the electrodes close to fibrosis/scar can lead to non-response. Sometimes it is impossible to get a real fibrosis/scar geometry because it requires to manually/automatically segment the fibrosis by MRI/MR-LGE data that usually are not available in routine clinical practice. Therefore, even simplified information about fibrosis/scar geometry may help in planning the operations and choosing the correct place for the electrodes implantation. The method 100 allows to create simplified fibrosis/scar geometry by segmented regions. For this, printed results of MRI study prepared by a physician may be used. Textual protocol includes information about segments/walls with damaged myocardial tissue. Such simplified fibrosis analysis allows evaluating approximately a distance between a pacing electrode and the fibrosis. Moreover, low conductivity in the fibrosis region may be set for calculation of a more accurate activation map.

Concerning the automatic calculation of electrical indexes and in order to assess cardiac functional status, in cardiology special standard indexes are used (see for example "*Doppler echocardiography and myocardial dyssynchrony: A practical update of old and new ultrasound technologies*" by Galderisi et al., *February* 2007 *Cardiovascular Ultrasound* 5 (1): 28, DOI: 10.1186/1476-7120-5-28) which are widely used in clinical research. Such indexes may reflect electrical or geometric features of a heart and show degree of pathology. Some of these indexes require information about location AHA segments. One can calculate such indexes automatically by using activation maps and the present segmented regions. Moreover, such heart indexes may be calculated for building of prediction models to prognose a treatment success failure. Concerning the calculation of personalized activation maps, in order to solve the inverse problem of electrocardiography (i.e., getting an activation map by ECG, see https://www.ibt.kit.edu/english/3741. php, Dössel, O. "*Inverse problem of electro-and magnetocardiography: Review and recent progress.*" *International Journal of Bioelectromagnetism* 2.2 (2000): 22, or Nenonen, Jukka T. "*Solving the inverse problem in magnetocardiography.*" *IEEE Engineering in Medicine and Biology Magazine* 13.4 (1994): 487-496), it is necessary to find a set of conductivities and a corresponding activation map (since the conductivities are initial conditions for obtaining an activation map) which give as an output an acceptable approximation to clinical ECG signal. For this, conductivity values are sorted out in cardiac points until the clinical ECG signals show an acceptable match for clinical use with the model ECG (concerning the calculation of the model ECG, see for example https://wiki.seg.org/wiki/The_eikonal_equation or Neic, Aurel, et al. "*Efficient computation of electrograms and ECGs in human whole heart simulations using a reaction—eikonal model.*" *Journal of computational physics* 346 (2017): 191-211). For example, considering a heart model that includes 5000 points and conductivity value in each point that is varied in the range [0.1, 10], the conductivity interval can be split into 30 equal parts. This means that 5000*30=150000 activation maps should be calculated. Among these maps, there is one activation map that gives the closest model ECG to the clinical ECG. The calculation of one activation map may take generally 20 seconds (taking into account parallelization). Thus, a calculation of 150000 activation maps requires 5000*30*20=3000000 seconds or approximately 833 hours of computer simulations for one patient. As evident this is unacceptable for realistic clinical use. With the aim to decrease the calculation count, it is possible to not consider all the cardiac points. For this, one can use the segmented regions. Instead of all 5000 points, one can consider only 26 centres of the segmented regions for conductivity setting and then interpolate conductivity from these centres into all heart points. In such way one can calculate only 26*30=780 activation maps or spend 26*30*20=15600 seconds (approximately 4 hours) of computer simulations for one patient. This time may be further optimized through an optimized procedure for choosing the conductivity. For example, the conductivity is low in fibrosis segments. Thus, conductivity values in such segments may be varied in diapason [0.1, 1] and this may decrease the number of computer simulations.

Finally, it is clear that modifications and variations can be made to what has been described and illustrated herein, without thereby departing from the scope of the present invention, as defined in the annexed claims. For example, the different embodiments described can be combined with each other to provide further solutions.

Figure 8A:
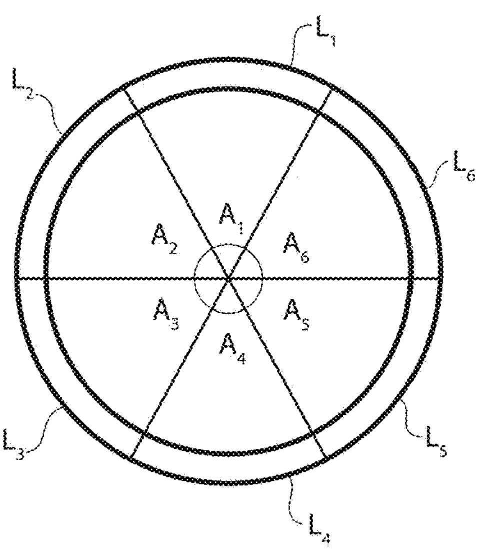
FIGS. 8A and 8B schematically show transversal sections of the heart mesh, for different cases.
Figure 8B:
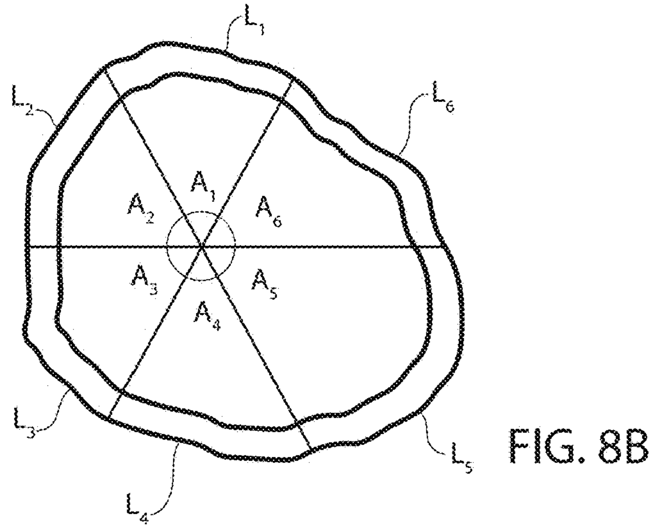

Moreover, in order to take into account the fact that the heart mesh 40 generally does not have exactly a circular shape when considered in section parallel to the heart base plane 52, the segmented regions $P_1$-$P_{26}$ can be defined differently than how previously discussed. In details and considering by way of example the segmented regions $P_1$-$P_6$, in case of perfectly circular shape of the heart mesh parallel to the heart base plane 52 (FIG. 8A, for example showing the annular section of the heart mesh 40 at the first distance segmenting plane 62*a*), circumferential angular ranges $A_1$-$A_6$ having the same value define lengths $L_1$-$L_6$ of the segmented regions $P_1$-$P_6$ (e.g., measured at the first distance segmenting plane 62*a* on the epicardium surface 70, even though analogous considerations apply for the endocardium surface 72) having the same value; on the other hand, in case of irregular closed shape of the heart mesh parallel to the heart base plane 52 (FIG. 8B), circumferential angular ranges $A_1$-$A_6$ having the same value define lengths $L_1$-$L_6$ of the segmented regions $P_1$-$P_6$ having different values among them. In this second case, it is possible to identify the segmented regions based on a different definition of the circumferential angular ranges that takes into account the irregularity of the heart mesh 40 in section and thus generates optimized segmented regions.

Figure 9:
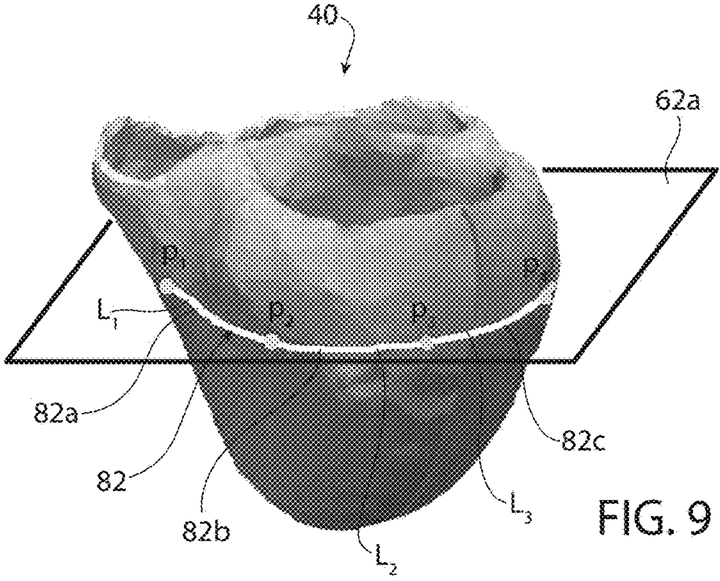
FIG. 9 is a perspective view of a mesh obtained through the method of FIG. 3 and corresponding to a step of the method, according to a different embodiment of the present invention.

In details, this is performed by keeping the same first criterion about the distance ranges as previously discussed and by considering, for the second criterion, circumferential angular ranges of variable sizes. More in details, the circumferential angular ranges $A_1$-$A_{26}$ are determined as follows and as shown in FIG. 9 (with reference to the first distance segmenting plane 62*a* and the left ventricle 66 alone).

In particular, considering exemplarily the first distance segmenting plane 62*a:*

- a respective external perimeter 82 of the epicardium surface 70 of the heart mesh 40 is determined along the first distance segmenting plane 62*a;*
- a plurality of perimeter segments 82*a*-82*f* are determined based on the external perimeter 82, the perimeter segments 82*a*-82*f* having each one a same length (perimeter segment length) $L_1$-$L_6$ ($L_1= \ldots =L_6=L$) and being consecutive to each other so as to form together the external perimeter 82 and being delimited each one by respective segment extremal points $p_1$-$p_6$ (in other words, the external perimeter 82 is divided into perimeter segments 82*a*-82*f* that have same length L and that are delimited each one by two respective segment extremal points $p_1$-$p_6$); and
- for each perimeter segment 82*a*-82*f*, determining the respective circumferential angular range $A_1$-$A_6$ based on the positions of its segment extremal points $p_1$-$p_6$ with respect to the left ventricular axis 58.

In details, each circumferential angular range $A_1$-$A_6$ is determined through the angular distance between its segment extremal points $p_1$-$p_6$ along the left ventricular axis 58.

These steps are repeated analogously for the right ventricle 68 and also for each one of the other distance segmenting planes 62*b*-62*d*, in order to determine all the circumferential angular ranges $A_1$-$A_{26}$ and thus all the segmented regions $P_1$-$P_{26}$. In particular, the perimeter segment length L can vary when varying the considered distance segmenting plane.

The invention claimed is:

1. Method (100) for identifying segmented regions ($P_1$-$P_{26}$) of a heart, the method being executed by a control unit (12) and comprising the steps of:

- acquiring (S09) a heart mesh (40), the heart mesh (40) being a 3D graphical representation of the heart, including a left ventricle (66), a right ventricle (68), a heart apex (56) and a heart base (50) of the heart;
- determining (S11) a heart base plane (52) corresponding to the heart base (50);
- determining (S15), based on the heart base (50) and the heart apex (56), a left ventricular axis (58) extending across the left ventricle (66), from the heart apex (56) to the heart base (50);
- using (S23) the heart base plane (52) and the left ventricular axis (58) to identify said segmented regions ($P_1$-$P_{26}$), the segmented regions ($P_1$-$P_{26}$) being indicative of the left ventricle (66) and the right ventricle (68), each segmented region ($P_1$-$P_{26}$) being a respective portion of the heart mesh (40) satisfying a respective first criterion about a distance range ($D_1$-$D_4$) from the heart base plane (52) and a respective second criterion about a circumferential angular range ($A_1$-$A_{26}$) about the left ventricular axis (58).

2. Method according to claim 1, further comprising the steps of:

acquiring (S01) a preliminary mesh (20) formed by first polygonal cells, the preliminary mesh (20) being a respective 3D graphical representation of the heart;

generating (S03) a convex hull (22) of the preliminary mesh (20);

determining (S05) an epicardium surface (24) and an endocardium surface (26) of the preliminary mesh (20) by comparing the preliminary mesh (20) and the convex hull (22), the endocardium surface (26) comprising a left ventricular endocardium surface (26*a*) and a right ventricular endocardium surface (26*b*);

determining (S05) annular edges (28*a*-28*c*) of the left ventricular endocardium surface (26*a*) and of the right ventricular endocardium surface (26*b*), extending at the epicardium surface (24);

determining (S07) a heart base portion (32) of the epicardium surface (24) lateral to the annular edges (28*a*-28*c*) of the left ventricular endocardium surface (26*a*) and of the right ventricular endocardium surface (26*b*), said heart base portion (32) of the epicardium surface (24) forming the heart base (36), wherein the step of acquiring (S09) the heart mesh (40) comprises generating the heart mesh (40) based on the preliminary mesh (20), the heart mesh (40) being formed by second polygonal cells with shape different from the shape of the first polygonal cells, said left ventricle (66) corresponding to the left ventricular endocardium surface (26*a*) and said right ventricle (68) corresponding to the right ventricular endocardium surface (26*b*).

3. Method according to claim 2, wherein the first polygonal cells have triangular shape and the second polygonal cells have tetrahedral shape.

4. Method according to claim 2, wherein the step of determining (S05) the epicardium surface (24) and the endocardium surface (26) of the preliminary mesh (20) comprises, for each point of the convex hull (22):

determining, for each point of the preliminary mesh (20), a respective distance of said point of the preliminary mesh (20) from the considered point of the convex hull (22);

determine a minimum distance among the distances of the points of the preliminary mesh (20) from the considered point of the convex hull (22); and labelling as part of the epicardium surface (24) the point of the preliminary mesh (20) having said minimum distance from the considered point of the convex hull (22), wherein the step of determining (S05) the epicardium surface (24) and the endocardium surface (26) of the preliminary mesh (20) further comprises labelling as part of the endocardium surface (26) the points of the preliminary mesh (20) without said minimum distances from the points of the convex hull (22).

5. Method according to claim 4, wherein the step of labelling the point as part of the endocardium surface (26) comprises:

determining a first and a second main clusters of points of the endocardium surface (26), the first and second main clusters having said annular edges (28*a*-28*c*), each annular edge (28*a*-28*c*) defining a respective opening (28*a*'-28*c*') of the first or second main cluster, the opening (28*a*') of the first main cluster having an area greater than an area of the openings (28*b*', 28*c*') of the second main cluster; and labelling the first main cluster as the left ventricular endocardium surface (26*a*) and the second main cluster as the right ventricular endocardium surface (26*b*).

6. Method according to claim 5, wherein the step of determining (S05) the epicardium surface (24) and the endocardium surface (26) of the preliminary mesh (20) further comprises, for each point of the preliminary mesh (20) that has been previously labelled as part of the endocardium surface (26) and that is isolated from the first and second main clusters of the endocardium surface (26) by means of the epicardium surface (24), re-labelling said point as part of the epicardium surface (24).

7. Method according to claim 2, wherein the step of determining (S05) the annular edges (28*a*-28*c*) of the left ventricular endocardium surface (26*a*) and of the right ventricular endocardium surface (26*b*) comprises, for each one of the left ventricular endocardium surface (26*a*) and of the right ventricular endocardium surface (26*b*), selecting endocardium edge points (30) of the left ventricular endocardium surface (26*a*) or of the right ventricular endocardium surface (26*b*), wherein each endocardium edge point (30) has a respective number of nearest neighbour points of the left ventricular endocardium surface (26*a*) or of the right ventricular endocardium surface (26*b*) that is lower than a neighbour point threshold number, and wherein the endocardium edge points (30) of the left ventricular endocardium surface (26*a*) define the annular edge (28*a*) of the left ventricular endocardium surface (26*a*) and the endocardium edge points (30) of the right ventricular endocardium surface (26*b*) define the annular edges (28*b*, 28*c*) of the right ventricular endocardium surface (26*b*).

8. Method according to claim 7, wherein the step of determining (S07) the heart base portion (32) comprises selecting epicardium edge points (34) of the epicardium surface (24), wherein each epicardium edge point (34) has at least one nearest neighbour point that is one of said endocardium edge points (30).

9. Method according to claim 2, further comprising the step of identifying (S21) the left ventricle (66) and the right ventricle (68) of the heart mesh (40) based on the left ventricular endocardium surface (26*a*) and the right ventricular endocardium surface (26*b*) of the preliminary mesh (20).

10. Method according to claim 2, further comprising the step of identifying (S25) an epicardium surface (70) and an endocardium surface (72) of the heart mesh (40) based on the epicardium surface (24) and the endocardium surface (26) of the preliminary mesh (20).

11. Method according to claim 10, further comprising the step of determining (S29) a muscle fibre orientation map (80) of the heart based on the heart apex (56), the heart base (50), the epicardium surface (70) and the endocardium surface (72) of the heart mesh (40), the muscle fibre orientation map (80) being a 3D graphical representation of the muscle fibre orientation of the heart.

12. Method according to claim 1, further comprising the step of identifying (S13) the heart apex (56) of the heart mesh (40), the heart apex (56) comprising one or more apex points of the heart mesh (40), wherein each point of the heart mesh (40) has a respective minimum distance from the heart base (50), and wherein the minimum distance of each apex point is maximum among the minimum distances of the points of the heart mesh (40) from the heart base (50).

13. Method according to claim 1, wherein the step of determining (S11) the heart base plane (52) comprises the following steps:

determining a left ventricular portion (54) of the heart base (50) of the heart mesh (40), extending at the left ventricle (66) and having annular shape; and determining the heart base plane (52) by applying to the left ventricular portion (54) of the heart base (50) a machine learning-based dimensionality reduction technique.

14. Method according to claim 13, wherein the step of determining (S15) the left ventricular axis (58) comprises determining a centroid (60) of the left ventricular portion (54) of the heart base (50), the centroid (60) extending in the heart base plane (52) and the left ventricular axis (58) passing through said centroid (60) and the heart apex (56) of the heart mesh (40), transversely to the heart base plane (52).

15. Method according to claim 1, further comprising the following steps:

determining a plurality of distance segmenting planes (62) that extend across the heart mesh (40) and are parallel to the heart base plane (52), each distance segmenting plane (62) having a respective distance from the heart base plane (52); and determining a plurality of angle segmenting planes (64) that extend across the heart mesh (40) and share the left ventricular axis (58) that lays on each of the angle segmenting planes (64), wherein the distance segmenting planes (62) define among them said respective distance ranges ($D_1$-$D_4$) from the heart base plane (52) and the angle segmenting planes (64) define among them said respective circumferential angular ranges ($A_1$-$A_{26}$) about the left ventricular axis (58).

16. Method according to claim 1, wherein the step of using (S23) the heart base plane (52) and the left ventricular axis (58) to identify said segmented regions ($P_1$-$P_{26}$) comprises determining the following segmented regions ($P_1$-$P_{26}$):

a first segmented region ($P_1$) to a sixth segmented region ($P_6$) having a first distance range ($D_1$) from the heart base plane (52) and having respectively a first circumferential angular range ($A_1$) to a sixth circumferential angular range ($A_6$) that are circumferentially consecutive among them along the total circumferential angular range of 360°;

a seventh segmented region ($P_7$) to a twelfth segmented region ($P_{12}$) having a second distance range ($D_2$) from the heart base plane (52) and having respectively a seventh circumferential angular range ($A_7$) to a twelfth circumferential angular range ($A_{12}$) that are circumferentially consecutive among them along the total circumferential angular range;

a thirteenth segmented region ($P_{13}$) to a sixteenth segmented region ($P_{16}$) having a third distance range ($D_3$) from the heart base plane (52) and having respectively a thirteenth circumferential angular range ($A_{13}$) to a sixteenth circumferential angular range ($A_{16}$) that are circumferentially consecutive among them along the total circumferential angular range;

a seventeenth segmented region ($P_{17}$) having a fourth distance range (D4) from the heart base plane (52) and having a seventeenth circumferential angular range ($A_{17}$) that is equal to the total circumferential angular range;

an eighteenth segmented region ($P_{18}$) to a twentieth segmented region ($P_{20}$) having the first distance range ($D_1$) from the heart base plane (52) and having respectively an eighteenth circumferential angular range ($A_{18}$) to a twentieth circumferential angular range ($A_{20}$) that are circumferentially consecutive among them along a partial circumferential angular range comprising the second circumferential angular range ($A_2$) and the third circumferential angular range ($A_3$) and, partially, the first circumferential angular range ($A_1$) and the fourth circumferential angular range ($A_4$);

a twenty-first segmented region ($P_{21}$) to a twenty-third segmented region ($P_{23}$) having the second distance range ($D_2$) from the heart base plane (52) and having respectively a twenty-first circumferential angular range ($A_{21}$) to a twenty-third circumferential angular range ($A_{23}$) that are circumferentially consecutive among them along the partial circumferential angular range; and a twenty-fourth segmented region ($P_{24}$) to a twenty-sixth segmented region ($P_{26}$) having the third distance range ($D_3$) from the heart base plane (52) and having respectively a twenty-fourth circumferential angular range ($A_{24}$) to a twenty-sixth circumferential angular range ($A_{26}$) that are circumferentially consecutive among them along the partial circumferential angular range, wherein the first distance range ($D_1$) to the fourth distance range ($D_4$) extend, consecutively and in continuity among them, from the heart base plane (52) to the heart apex (56), and wherein the first segmented region ($P_1$) to the seventeenth segmented region ($P_{17}$) correspond to the left ventricle (66) and the eighteenth segmented region ($P_{18}$) to the twenty-sixth segmented region ($P_{26}$) correspond to the right ventricle (68).

17. Method according to claim 16, wherein the first circumferential angular range ($A_1$) to the sixth circumferential angular range ($A_6$) have a same angular value, wherein the seventh circumferential angular range ($A_7$) to the twelfth circumferential angular range ($A_{12}$) coincide, respectively, with the first circumferential angular range ($A_1$) to the sixth circumferential angular range ($A_6$), wherein the thirteenth circumferential angular range ($A_{13}$) comprises the seventh circumferential angular range ($A_7$) and, partially, the eighth circumferential angular range ($A_8$) and the twelfth circumferential angular range ($A_{12}$), wherein the fourteenth circumferential angular range ($A_{14}$) comprises partially the eighth circumferential angular range ($A_8$) and the ninth circumferential angular range ($A_9$), wherein the fifteenth circumferential angular range ($A_{15}$) comprises the tenth circumferential angular range ($A_{10}$) and, partially, the ninth circumferential angular range ($A_9$) and the eleventh circumferential angular range ($A_{11}$), and wherein the sixteenth circumferential angular range ($A_{16}$) comprises the eleventh circumferential angular range ($A_{11}$) and the twelfth circumferential angular range ($A_{12}$), wherein the twenty-first angular range ($A_{21}$) to the twenty-third circumferential angular range ($A_{23}$) coincide, respectively, with the eighteenth angular range ($A_{18}$) to the twentieth circumferential angular range ($A_{20}$), and wherein the twenty-fourth circumferential angular range ($A_{24}$) to the twenty-sixth circumferential angular range ($A_{26}$) coincide, respectively, with the twenty-first angular range ($A_{21}$) to the twenty-third circumferential angular range ($A_{23}$).

18. Method according to claim 16, wherein the plurality of distance segmenting planes (62) comprises:

a first distance segmenting plane (62*a*) extending at a first distance ($d_1$) from the heart base plane (52), the first distance range ($D_1$) being defined, orthogonally to the heart base plane (52), between the heart base plane (52) and the first distance segmenting plane (62*a*);

a second distance segmenting plane (62*b*) extending at a second distance ($d_2$) from the heart base plane (52), greater than the first distance ($d_1$), the second distance range ($D_2$) being defined, orthogonally to the heart base plane (52), between the first distance segmenting plane (62*a*) and the second distance segmenting plane (62*b*);

a third distance segmenting plane (62*c*) extending at a third distance ($d_3$) from the heart base plane (52), greater than the second distance ($d_2$), the third distance range ($D_3$) being defined, orthogonally to the heart base plane (52), between the second distance segmenting plane (62*b*) and the third distance segmenting plane (62*c*);

a fourth distance segmenting plane (62*d*) extending at a fourth distance ($d_4$) from the heart base plane (52) corresponding to the heart apex (56), the fourth distance ($d_4$) being greater than the third distance ($d_3$), the fourth distance range ($D_4$) being defined, orthogonally to the heart base plane (52), between the third distance segmenting plane (62*c*) and the fourth distance segmenting plane (62*d*), wherein the step of using (S23) the heart base plane (52) and the left ventricular axis (58) to identify said segmented regions ($P_1$-$P_{26}$) comprises, for each one of the distance segmenting planes (62*a*-62*d*):

determining a respective external perimeter (82) of the heart mesh (40) along said segmenting plane (62*a*-62*d*);

based on the external perimeter (82), determining perimeter segments (82*a*-82*f*) that have each one a same perimeter segment length ($L_1$-$L_6$), are consecutive to each other so as to form together the external perimeter (82) and are delimited each one by respective segment extremal points ($p_1$-$p_6$); and for each perimeter segment (82*a*-82*f*), determining the respective circumferential angular range ($A_1$-$A_{26}$) based on the positions of the respective segment extremal points ($p_1$-$p_6$) with respect to the left ventricular axis (58), wherein the perimeter segment length ($L_1$-$L_6$) is different for each distance segmenting plane (62*a*-62*d*).

19. Computer program product storable in a control unit (12), the computer program being designed so that, when executed, the control unit (12) becomes configured to perform a method (100) according to claim 1.

20. Segmented region identifier device (10) comprising a control unit (12) configured to:

acquire (S09) a heart mesh (40), the heart mesh (40) being a 3D graphical representation of a heart, including a left ventricle (66), a right ventricle (68), a heart apex (56) and a heart base (50) of the heart;

determine (S11) a heart base plane (52) corresponding to the heart base (50);

determine (S15), based on the heart base (50) and the heart apex (56), a left ventricular axis (58) extending across the left ventricle (66), from the heart apex (56) to the heart base (50);

use (S23) the heart base plane (52) and the left ventricular axis (58) to identify segmented regions ($P_1$-$P_{26}$) of the heart, the segmented regions ($P_1$-$P_{26}$) being indicative of the left ventricle (66) and the right ventricle (68), each segmented region ($P_1$-$P_{26}$) being a respective portion of the heart mesh (40) satisfying a respective first criterion about a distance range ($D_1$-$D_4$) from the heart base plane (52) and a respective second criterion about a circumferential angular range ($A_1$-$A_{26}$) about the left ventricular axis (58).

* * * * *